United States Patent
Moore et al.

(10) Patent No.: US 10,761,704 B2
(45) Date of Patent: Sep. 1, 2020

(54) GRAPHICAL HIGHLIGHT FOR PROGRAMMING A CONTROL

(71) Applicant: BRAEBURN SYSTEMS, LLC, Montgomery, IL (US)

(72) Inventors: Glenn A Moore, Geneva, IL (US); Daniel S Poplawski, Oswego, IL (US)

(73) Assignee: Braeburn Systems LLC, Montgomery, IL (US)

( * ) Notice: Subject to any disclaimer, the term of this patent is extended or adjusted under 35 U.S.C. 154(b) by 135 days.

(21) Appl. No.: 14/741,252

(22) Filed: Jun. 16, 2015

(65) Prior Publication Data
US 2016/0154576 A1    Jun. 2, 2016

Related U.S. Application Data

(60) Provisional application No. 62/012,630, filed on Jun. 16, 2014.

(51) Int. Cl.
*G06F 3/0484*   (2013.01)
*G06F 3/0481*   (2013.01)
*F24F 11/30*    (2018.01)

(52) U.S. Cl.
CPC .......... *G06F 3/04847* (2013.01); *F24F 11/30* (2018.01); *G06F 3/04817* (2013.01)

(58) Field of Classification Search
CPC ............. G06F 3/04847; G06F 3/04817; G06F 3/04842; F24F 11/0086
See application file for complete search history.

(56) References Cited

U.S. PATENT DOCUMENTS

| | | |
|---|---|---|
| 2,054,039 A | 9/1936 | Persons |
| 2,060,636 A | 11/1936 | Persons |
| 2,253,418 A | 8/1941 | Crandall et al. |
| 2,703,228 A | 3/1955 | Fleisher |
| 3,309,021 A | 3/1967 | Powers |
| 3,385,574 A | 5/1968 | Lohman |

(Continued)

FOREIGN PATENT DOCUMENTS

| | | |
|---|---|---|
| JP | 58065977 | 4/1983 |
| JP | 2004218436 | 8/2004 |
| JP | 2006009596 | 1/2006 |

OTHER PUBLICATIONS

ComfortLink II XL950 Control (see http://www.bayareaservice.com/wp-content/uploads/2011/12/TZONE950-Owners.pdf; date 2011 and accessed on May 18, 2017).*

(Continued)

*Primary Examiner* — Jung-Mu T Chang
(74) *Attorney, Agent, or Firm* — The Law Offices of Konrad Sherinian, LLC

(57) ABSTRACT

The invention provides a thermostat control display having a programming function button, day of the week icons, a table for displaying time and temperature parameters and a graphical highlight pattern that links the table and the day of the week icons. The button, icons and table comprise touch sensitive areas adapted to activate a predetermined display response. Upon selection of a day of the week icon the graphical highlight pattern will be extended to surround the selected day of the week icon so that the table depicting temperature and time parameters to be assigned to the selected day of the week are visually linked to the selected day of the week.

15 Claims, 15 Drawing Sheets

(56) References Cited

U.S. PATENT DOCUMENTS

| | | |
|---|---|---|
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A * | 5/1983 | Stewart ............... F23N 5/203 165/238 |
| 4,399,031 A | 8/1983 | Imano et al. |
| 4,606,401 A * | 8/1986 | Levine ............... G05B 19/104 165/11.1 |
| 4,730,941 A | 3/1988 | Levine et al. |
| 4,733,719 A | 3/1988 | Levine |
| 4,783,800 A * | 11/1988 | Levine ............... G04G 11/00 368/10 |
| 4,838,482 A | 6/1989 | Vogelzang |
| 4,948,040 A * | 8/1990 | Kobayashi ........... F24F 11/0009 165/217 |
| 4,967,382 A | 10/1990 | Hall |
| 5,023,432 A * | 6/1991 | Boykin ............... G05D 23/1904 219/483 |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A * | 10/1997 | Uptegraph ........... F24F 11/006 165/268 |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Burns |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,213,404 B1 | 4/2001 | Dushane |
| 6,223,992 B1 * | 5/2001 | Yasui ............... G05D 23/1904 236/46 R |
| 6,241,156 B1 | 6/2001 | Kline et al. |
| 6,304,803 B1 | 10/2001 | Dao |
| 6,315,211 B1 * | 11/2001 | Sartain ............... G05D 23/1905 236/46 R |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 * | 12/2002 | Kitayama ........... G06F 17/30902 |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 * | 9/2003 | Fox ............... G05D 23/1904 165/200 |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 * | 5/2006 | Wimsatt ............... G05B 15/02 345/173 |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| 7,156,317 B1 | 1/2007 | Moore |
| 7,156,318 B1 | 1/2007 | Rosen |
| D536,271 S | 2/2007 | Moore |
| 7,181,317 B2 * | 2/2007 | Amundson ........... G05B 19/0426 700/276 |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 * | 12/2007 | Shah ............... G05B 15/02 236/46 R |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 * | 7/2009 | Pouchak ............... G05D 23/1905 236/44 C |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 * | 4/2010 | Bergman ............... G05B 19/106 236/46 A |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 * | 12/2010 | Siddaramanna ....... F24F 11/0086 236/91 D |
| 7,861,941 B2 | 1/2011 | Schultz et al. |
| 7,867,646 B2 | 1/2011 | Rhodes |
| 7,941,819 B2 * | 5/2011 | Stark ............... G06F 17/30861 348/563 |
| 7,954,726 B2 | 6/2011 | Siddaramanna et al. |
| 7,963,454 B2 * | 6/2011 | Sullivan ............... G05B 15/02 236/51 |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,091,795 B1 * | 1/2012 | McLellan ............... G05D 23/1923 236/51 |
| 8,167,216 B2 | 5/2012 | Schultz et al. |
| 8,175,782 B2 | 5/2012 | Gepperth et al. |
| 8,195,313 B1 * | 6/2012 | Fadell ............... F24F 11/30 700/83 |
| D662,837 S | 7/2012 | Morrow |
| D662,838 S | 7/2012 | Morrow |
| D662,839 S | 7/2012 | Morrow |

(56) References Cited

U.S. PATENT DOCUMENTS

| | | | |
|---|---|---|---|
| D662,840 S | 7/2012 | Morrow | |
| D663,224 S | 7/2012 | Morrow | |
| 8,219,251 B2 | 7/2012 | Amundson et al. | |
| 8,239,067 B2* | 8/2012 | Amundson | G05B 19/0426 236/91 D |
| 8,239,922 B2 | 8/2012 | Sullivan | |
| 8,244,383 B2* | 8/2012 | Bergman | G05B 19/106 236/91 D |
| 8,280,536 B1 | 10/2012 | Fadell et al. | |
| 8,346,396 B2 | 1/2013 | Amundson et al. | |
| 8,387,892 B2 | 3/2013 | Koster et al. | |
| 8,517,088 B2 | 8/2013 | Moore et al. | |
| 8,538,588 B2 | 9/2013 | Kasper | |
| 8,549,658 B2* | 10/2013 | Kolavennu | H04L 41/0806 726/21 |
| 8,606,409 B2* | 12/2013 | Amundson | G05B 19/0426 700/278 |
| 8,620,460 B2* | 12/2013 | Bergman | G05B 19/106 700/17 |
| 8,689,353 B2 | 4/2014 | Bünter | |
| 8,690,074 B2 | 4/2014 | Moore et al. | |
| 8,701,210 B2 | 4/2014 | Cheng et al. | |
| 8,733,667 B2 | 5/2014 | Moore et al. | |
| 8,950,687 B2* | 2/2015 | Bergman | B60H 1/00657 165/209 |
| 8,978,994 B2 | 3/2015 | Moore et al. | |
| 8,990,718 B2* | 3/2015 | Thorson | B60H 1/00985 715/764 |
| 9,014,860 B2* | 4/2015 | Moore | F24F 11/0086 700/278 |
| 9,088,306 B1* | 7/2015 | Ramachandran | H04W 24/02 |
| 9,201,431 B2 | 12/2015 | Lyle | |
| 9,304,676 B2 | 4/2016 | Poplawski | |
| 9,489,062 B2* | 11/2016 | Corcoran | F24F 11/30 |
| 10,255,930 B2* | 4/2019 | Marti | G10L 15/22 |
| 2001/0003451 A1 | 6/2001 | Armstrong | |
| 2002/0065809 A1* | 5/2002 | Kitayama | G06F 17/30902 |
| 2002/0096572 A1 | 7/2002 | Chene et al. | |
| 2004/0133314 A1* | 7/2004 | Ehlers | G06Q 40/06 700/276 |
| 2004/0193324 A1 | 9/2004 | Hoog | |
| 2004/0245352 A1 | 12/2004 | Smith | |
| 2004/0256472 A1 | 12/2004 | DeLuca | |
| 2004/0260427 A1* | 12/2004 | Wimsatt | G05B 15/02 700/275 |
| 2005/0033707 A1 | 2/2005 | Ehlers | |
| 2005/0040248 A1* | 2/2005 | Wacker | F24F 11/0086 236/51 |
| 2005/0040249 A1 | 2/2005 | Wacker | |
| 2005/0082836 A1 | 4/2005 | Lagerwey | |
| 2005/0108620 A1* | 5/2005 | Allyn | G06F 3/04845 715/255 |
| 2005/0116023 A1* | 6/2005 | Amundson | G05B 19/0426 235/376 |
| 2005/0119771 A1* | 6/2005 | Amundson | G05B 19/0426 700/86 |
| 2005/0119793 A1* | 6/2005 | Amundson | G05B 19/0426 700/276 |
| 2005/0194457 A1* | 9/2005 | Dolan | G05D 23/1904 236/51 |
| 2005/0198591 A1* | 9/2005 | Jarrett | G06K 9/222 715/863 |
| 2006/0030954 A1 | 2/2006 | Bergman | |
| 2006/0290140 A1 | 6/2006 | Yoshida | |
| 2006/0206220 A1* | 9/2006 | Amundson | G05B 19/0426 700/87 |
| 2006/0220386 A1 | 10/2006 | Wobben | |
| 2007/0016311 A1* | 1/2007 | Bergman | G05B 19/106 700/19 |
| 2007/0045429 A1* | 3/2007 | Chapman, Jr. | F24F 11/30 236/46 C |
| 2007/0045431 A1* | 3/2007 | Chapman, Jr. | F24F 11/30 236/46 C |
| 2007/0045441 A1 | 3/2007 | Ashworth | |
| 2007/0114291 A1* | 5/2007 | Pouchak | G05D 23/1905 236/44 C |
| 2007/0173971 A1* | 7/2007 | Richardson | G07F 7/00 700/231 |
| 2007/0221741 A1* | 9/2007 | Wagner | F24F 11/0086 236/94 |
| 2007/0228182 A1 | 10/2007 | Wagner et al. | |
| 2007/0228183 A1* | 10/2007 | Kennedy | F24F 11/30 236/1 C |
| 2007/0257120 A1 | 11/2007 | Chapman et al. | |
| 2007/0278320 A1 | 12/2007 | Lunacek et al. | |
| 2008/0154437 A1* | 6/2008 | Alexanian | A01G 25/16 700/284 |
| 2008/0271475 A1* | 11/2008 | Wuesthoff | F25D 17/065 62/447 |
| 2009/0001182 A1* | 1/2009 | Siddaramanna | G05D 23/1905 236/46 R |
| 2009/0024965 A1* | 1/2009 | Zhdankin | G06F 17/2785 715/863 |
| 2009/0057424 A1 | 3/2009 | Sullivan et al. | |
| 2009/0057427 A1* | 3/2009 | Geadelmann | G05B 15/02 236/51 |
| 2009/0062964 A1* | 3/2009 | Sullivan | G05B 15/02 700/276 |
| 2009/0129931 A1 | 5/2009 | Stiesdal | |
| 2009/0140056 A1* | 6/2009 | Leen | G05B 13/02 236/49.3 |
| 2009/0140064 A1* | 6/2009 | Schultz | G05D 23/1905 236/51 |
| 2010/0031193 A1* | 2/2010 | Stark | G06F 17/30861 715/810 |
| 2010/0070089 A1 | 3/2010 | Harrod et al. | |
| 2010/0117975 A1 | 5/2010 | Cho et al. | |
| 2010/0127502 A1 | 5/2010 | Uchino et al. | |
| 2010/0145528 A1 | 6/2010 | Bergman et al. | |
| 2010/0318200 A1 | 12/2010 | Foslien | |
| 2011/0004825 A1 | 1/2011 | Wallaert | |
| 2011/0031806 A1 | 2/2011 | Altonen et al. | |
| 2011/0054710 A1* | 3/2011 | Imes | F24F 11/63 700/286 |
| 2011/0112998 A1* | 5/2011 | Abe | G06N 5/003 706/13 |
| 2011/0261002 A1 | 10/2011 | Verthein | |
| 2011/0273394 A1 | 11/2011 | Young | |
| 2012/0067561 A1* | 3/2012 | Bergman | B60H 1/00657 165/257 |
| 2012/0074710 A1 | 3/2012 | Yoshida | |
| 2012/0131504 A1* | 5/2012 | Fadell | F24F 11/0086 715/810 |
| 2012/0168524 A1 | 7/2012 | Moore et al. | |
| 2012/0169675 A1 | 7/2012 | Moore et al. | |
| 2012/0191257 A1* | 7/2012 | Corcoran | H04L 12/2818 700/278 |
| 2012/0203379 A1* | 8/2012 | Sloo | G05D 23/1902 700/276 |
| 2012/0221149 A1 | 8/2012 | Kasper | |
| 2012/0229521 A1* | 9/2012 | Hales, IV | F24F 11/0012 345/684 |
| 2012/0232703 A1* | 9/2012 | Moore | G05D 23/1904 700/278 |
| 2012/0239221 A1* | 9/2012 | Mighdoll | F24F 11/0012 700/300 |
| 2012/0329528 A1 | 12/2012 | Song | |
| 2013/0024799 A1* | 1/2013 | Fadell | G06F 3/04847 715/771 |
| 2013/0032414 A1 | 2/2013 | Yilmaz | |
| 2013/0056989 A1 | 5/2013 | Sabhapathy | |
| 2013/0215088 A1 | 8/2013 | Son et al. | |
| 2013/0263034 A1* | 10/2013 | Bruck | G06F 3/04842 715/771 |
| 2013/0338838 A1* | 12/2013 | Moore | F24F 11/0086 700/278 |
| 2013/0345883 A1* | 12/2013 | Sloo | F24F 11/0086 700/276 |
| 2014/0152631 A1 | 6/2014 | Moore et al. | |

(56) References Cited

U.S. PATENT DOCUMENTS

| | | | |
|---|---|---|---|
| 2014/0163746 A1* | 6/2014 | Drew | F24F 11/0086 700/276 |
| 2014/0200942 A1* | 7/2014 | Benjamin | G06Q 10/1093 705/7.18 |
| 2014/0316581 A1* | 10/2014 | Fadell | G05D 23/1904 700/276 |
| 2014/0319233 A1* | 10/2014 | Novotny | G05D 23/19 236/94 |
| 2015/0006184 A1* | 1/2015 | Marti | G10L 15/22 704/275 |
| 2015/0081568 A1 | 3/2015 | Land, III | |
| 2015/0167995 A1 | 6/2015 | Fadell | |
| 2015/0223160 A1* | 8/2015 | Ho | H04W 48/20 370/338 |
| 2015/0233595 A1* | 8/2015 | Fadell | F24F 11/30 700/278 |
| 2015/0280935 A1 | 10/2015 | Poplawski et al. | |
| 2016/0062618 A1* | 3/2016 | Fagan | G06F 3/04847 715/772 |
| 2016/0124628 A1* | 5/2016 | Poplawski | G06F 3/04817 715/771 |
| 2016/0124828 A1 | 5/2016 | Moore et al. | |
| 2016/0131385 A1 | 5/2016 | Poplawski et al. | |
| 2016/0154576 A1* | 6/2016 | Moore | F24F 11/30 715/708 |
| 2016/0370027 A1* | 12/2016 | Bruck | F24F 11/0086 |
| 2017/0059196 A1* | 3/2017 | Stefanski | F24F 11/0086 |
| 2017/0076263 A1* | 3/2017 | Bentz | H04W 4/80 |
| 2017/0103689 A1 | 4/2017 | Moore et al. | |
| 2017/0131825 A1 | 5/2017 | Moore et al. | |
| 2017/0300025 A1 | 10/2017 | Moore et al. | |
| 2017/0364104 A1 | 12/2017 | Poplawski et al. | |
| 2018/0080669 A1* | 3/2018 | Corcoran | F24F 11/30 |

OTHER PUBLICATIONS

Galitz, the essential guide to user interface design 2002.*
Cover letter, notice of allowance of corresponding Mexican patent application of the same disclosure, allowed claims in Spanish and English.
ComfortLink II XL950 Control, User Guide, Trane U.S. Inc., 2011.
Cardio lie Installer's Guide, System Version 2.5xx, 5th edition, 2008, Secant Home Automation Inc.
What you should know about flexible displays (FAQ); http://news.cnet.com/8301-1035_3-57607171-94/what-you-should-know-about-flexible-d . . . ; Nov. 25, 2013.
BRAE8URN Systems LLC, "Temperature Limiting Adjustments for heating and Cooling (1000 Series)", Mportant Installation Instructions.

* cited by examiner

GRAPHICAL HIGHLIGHT FOR PROGRAMMING A CONTROL

The present invention claims priority to Provisional Application No. 62/012,630 filed Jun. 16, 2014.

The present invention pertains to a programmer for an electronic control device, such as a building environmental control or thermostat and in particular, a graphical user interface for an application ("app") for programming a control device.

BACKGROUND

HVAC control systems are used to control the environment within a building and are more frequently linked via the internet for web-enabled building control. The internet connection allows receipt of instructions from a remote and/or mobile device. Use of remote devices to control building environment systems can be complicated to program. Many wireless network communication protocols exist, such as Bluetooth, DSRC, EnOcean, IrDA, Redlink, RFC, Wi-Fi or Zigbee®. These wireless network communications can provide a link to components such as routers, hubs, sensors, computers, mobile phones or tablets and thermostats. A multitude of software and graphical user interfaces may be used to attempt to set-up and control the systems. All of this complexity can lead to layers of technical problems for the system's owners/principal users. In particular, many users have difficulty with set-up procedures when there are a multitude of instructions and set-point parameters to adjust.

Smartphones are more commonly being used to interface and control household items such as alarms, appliances and thermostats. While use of a smartphone allows more flexibility for the user to make adjustments and control items from remote locations, such phone user interfaces can be difficult to use and navigate. The present invention resolves such issues.

SUMMARY

The present invention provides for a building environment control display comprising a programming function button, day of a week icons, a table for displaying time and temperature parameters and a graphical highlight pattern that links the table and the day of the week icons. The button, icons and table may comprise touch sensitive areas adapted to activate a predetermined display response. Upon selection of a day of the week icon the graphical highlight pattern may be extended to surround the selected day of the week icon, so that the table depicting temperature and time parameters to be assigned to the selected day of the week may be visually linked to the selected day of the week. The day of the week icon may be displayed having an indicia that is the same or similar to an indicia of the graphical highlight pattern.

The table may have a generally rectangular shape and the day of the week icons may be aligned generally adjacent to a side of the table and the graphical highlight pattern may be disposed between the side of the table and the selected day of the week icon. The day of the week icon may have a geometric shape and upon selection of the day of the week icon the graphical highlight pattern may be modified to surround at least on one side the day of the week icon in order to provide a bubble. The geometric shape may be a circle and a portion of the geometric shape and a portion of the bubble may form concentric radiuses. A group of day of the week icons may be arranged side-by-side and may be paired together by the graphical highlight pattern and surrounds each of the day of the week icons within the bubble. The bubble encompasses the table and the selected day of the week icon(s). Data may be displayed on the table and may be modified while the bubble remains static.

The data displayed on the table may alternate between time and temperature parameters while the graphical highlight pattern remains static and surrounds the selected days of week icons, so that the settings for time and temperature may be programmed simultaneously for the selected days of week by sequentially selecting set-points for a time duration followed by a set point for temperature, or vice versa. A regrouping button may provide for regrouping a first and second group of day of the week icons, whereby a display having the first group denoted by a first indicia and the second group denoted by a second indicia is regrouped to a third group of day of the week icons denoted by a third indicia and the table having a modified graphical highlight pattern linked to the third group of day of the week icons that were regrouped. A help button may be provided that is synchronized with a mode setting of the control, whereby a predetermined help screen based on the mode setting is automatically selected at the time the help button is selected.

Upon selection of a Fan Mode a first help screen may be displayed upon selection of a Home Mode a second help screen may be displayed. Upon selecting a Programming Mode a third help screen may be displayed. And upon selection of a System Mode a fourth help screen may be displayed.

A graphical highlight pattern may be provided that alters the display indicia of an icon in order to provide a graphical feature denoting the activation of the icon so that a user can be prompted to touch the icon in order to progress through a programming routine. The graphical highlight pattern may include an outline circumscribing the pertinent icon, the outline begin displayed when a previous programming function is selected on the display.

The outline may circumscribe an increment and decrement button and the outline may be displayed as a result of selection of either a time or temperature icon on the table and the outline continues to be displayed around the icon until the incrementing or decrementing for the particular time of temperature icon is complete.

The graphical highlight pattern may include a contrasting background displayed behind or adjacent to the particular segment of the time or temperature icon from the table. The table includes time of day segments including Morning, Day, Evening or Night segments, or Occupied and Unoccupied. Each segment including an icon for time, heat temperature and cool temperature and the contrasting background displayed behind or adjacent the time, heat temperature and cool temperature alphanumeric icons for the selected segment when any one of the time, heat temperature, cool temperature or time of day segments are selected. The table may be arranged having rows that designate the time of day segments and the table is arranged having columns that designate time, heat temperature and cool temperature.

In an embodiment, the invention provides a method of programming a thermostat comprising the steps of selecting a programming function via activation of a graphical interface, selecting at least one day of a week icon as a first group of day of the week icons, selecting from a table either a time or temperature icon in order to set either the time or temperature set-point for the selected day of the week icon that is displayed having a first graphical highlight pattern that automatically links the table with the selected day of the week icons. The steps may further comprise selecting a second group of day of the week icons and selecting either a time or temperature setting for the selected second group of day of the week icons that are linked to the table by a second graphical highlight pattern having a different pattern than the first graphical highlight pattern.

The method may further comprise regrouping the first and second group of day of the week icons whereby a display having the first group denoted by a first indicia and the second group denoted by a second indicia selecting a regrouped set of day of the week icons denoted by a third indicia selecting a regroup button and displaying the table having a modified graphical highlight pattern linked to the regrouped set of day of the week icons. The first and second indicia may comprise the color of the geometric shape surrounding the alphanumeric symbol for each day of the week and the third indicia comprises the color of the alphanumeric symbol for each day of the week. The control may include Fan, Home, Programming and System Mode functions and while in Fan Mode, selecting the Help function will display a predetermined help page specified for the Fan Mode, while in Home Mode, selecting the Help function will display a predetermined second help page specified for the Home Mode, while in Programming Mode, selecting the Help function will display a predetermined third help page specified for the Programming Mode and while in System Mode, selecting the Help function will display a predetermined fourth help page specified for the System Mode will be displayed.

In a further embodiment a method of presenting input icons on a thermostat display may comprise the steps of displaying a programming function button, displaying a plurality of day icons to be selected for establishing set-points, displaying a table adjacent to the selected group of day icons, the table displaying temperature and time parameters, displaying a first graphical highlight pattern that links the table to the first group of day icons. The method may further comprise the steps displaying a second group of day icons to be selected for establishing set-points and displaying a second graphical highlight pattern to link the table to the second group of day icons. The method may further comprise the steps of displaying a mode function icon, displaying a presently selected mode, automatically displaying a predetermined help screen based on the presently selected mode.

In another embodiment, the control may include Fan, Home, Programming and System Mode functions and while in Fan Mode, selecting the Help function will display a predetermined help page specified for the Fan Mode, while in Home Mode, selecting the Help function will display a predetermined second help page specified for the Home Mode, while in Programming Mode, selecting the Help function will display a predetermined third help page specified for the Programming Mode and while in System Mode, selecting the Help function will display a predetermined fourth help page specified for the System Mode will be displayed. The method may further comprise the steps of displaying the graphical highlight pattern based on a geometric shape of the day of the week icons and modifying the graphical highlight pattern to surround at least on one side, the day of the week icon, and the surrounding portion of the graphical highlight pattern co-linear with the geometric shape at that portion based upon selection of the day of the week icons.

Figure 1:
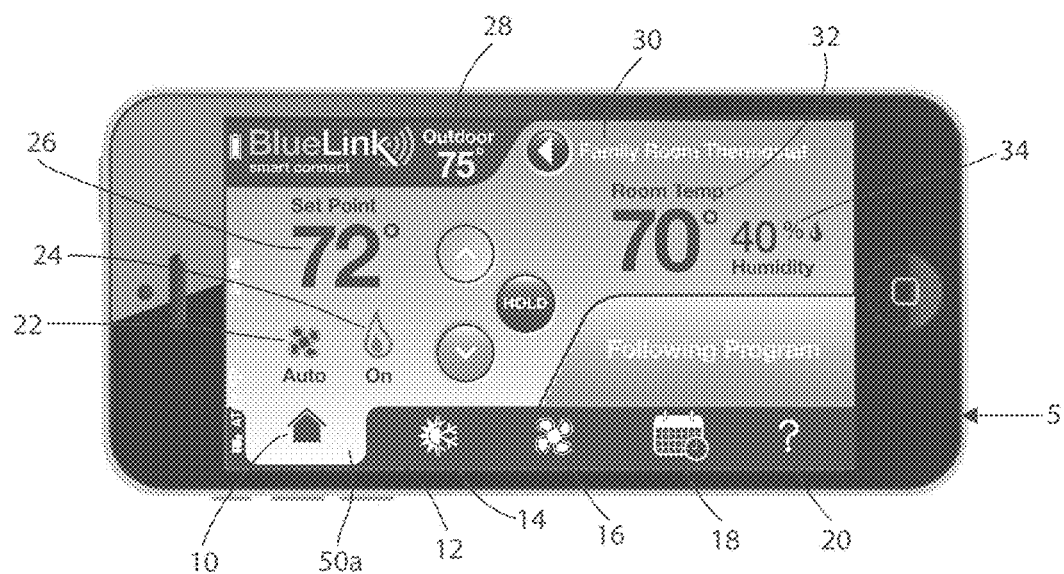
FIGS. 1-6 depict screen shots of a programming app for controlling a climate control system.

While the invention is amenable to various modifications and alternate forms, specific embodiments have been shown by way of example in the drawings and will be described in detail, it should be understood that the intention is not to limit the invention to the particular embodiments described. The intention is to cover all modifications, equivalents and alternatives falling within the spirit and the scope of the invention.

DETAILED DESCRIPTION

FIGS. 1-20 depict embodiments of an invention for programming a building environment control system. Each of the FIGS. 1-9 depict a smartphone 5 housing display screen 7 and the pertinent display screen for operation and control of a thermostat. However, it is to be understood that the display depicted in each of these figures could also be a display that is provided directly on a thermostat or other appliance. In an embodiment, the display screens are pages that are displayed by an app loaded on to a cell phone, as is known by traditional means. Also, the programming and control of the app on a smartphone allows for communication with a remote thermostat or other appliance via well-known wireless connections, or Wi-Fi or other wireless communication standards such as CDMA2000/IMT-2000, or IEEE 802.12.

It is to be understood that each of the icons and "buttons" are touchpads provided on the graphical user interface (GUI) display of the smartphone device 5, or the thermostat itself. In an alternate embodiment, the present invention may be used on a device that is not touchscreen capable and by using a mouse or other means of activating the icon and selecting using a click of the keyboard or mouse, the operation of the invention will correspond to the descriptions below.

Turning to FIG. 1, a home page is displayed, which is designated by the icon 10 for a home. The navigation bar 12 includes the icons for home 10, system mode (heating, cooling) 14, fan mode 16, programming mode (programming) 18 and help ("?") 20.

The display in the home mode also includes icons for the fan 22. In FIG. 1 the fan is depicted as being in auto mode. An icon for heat 24 is depicted in the on mode. A temperature set point icon 26 is shown with a set point of 72 degrees Fahrenheit. Outdoor temperature icon 28 depicts the outdoor temperature as being 75 degrees Fahrenheit. Thermostat identification text 30 indicates that the display is in the "Home mode for the family room thermostat." Room temperature icon 32 depicts the room temperature is currently at 70 degrees Fahrenheit. A humidity icon 34 currently indicates 40% humidity. In the center of the display the "up" adjustment icon 40 is used to increment the setting upward. The "down" icon 42 is used to decrement the setting information. The hold button 44 is generally used to hold the settings at their current setting parameter.

Figure 2:
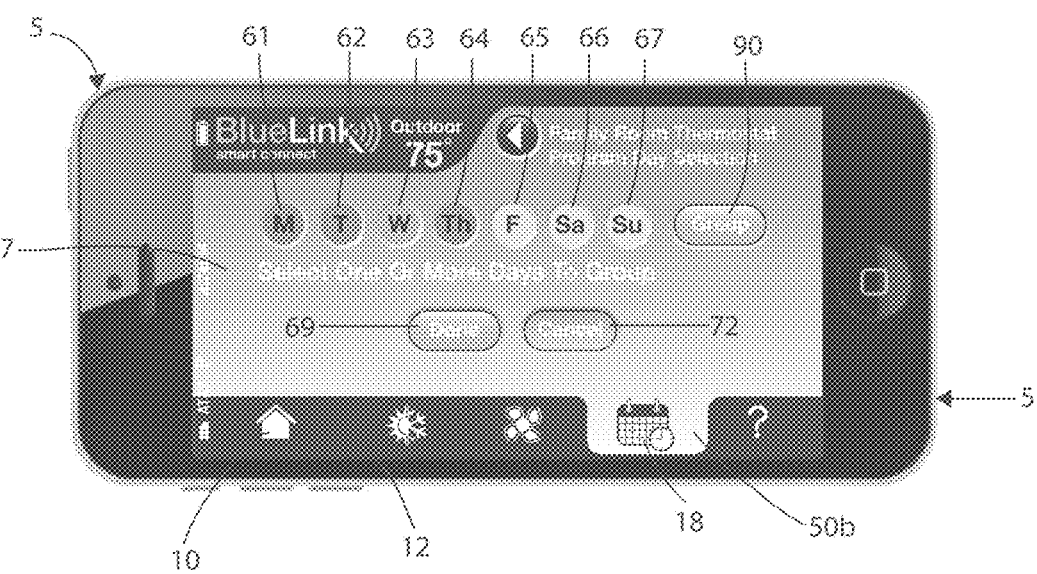

The invention is discussed further with respect to the selection of the programming function identified by icon 18. Turning to FIG. 2, when the programming icon on the navigation bar 12 is selected, a graphical interface selection cue appears around the programming icon. It can be seen that the graphical interface cue 50b surrounds the programming (calendar) icon 18. In a preferred embodiment, the cue 50b will be a lighter color than the rest of the control bar 12. Upon selecting the programming icon 18, the graphical interface cue 50a (FIG. 1) was eliminated from the area surrounding the home icon 10 and a cue is displayed at the programming icon 18. The main display of FIG. 2 depicts day of the week icons 61-67, representing the days of the week, Monday through Sunday. Also provided is an enter button 69 and cancel button 72.

Figure 3:
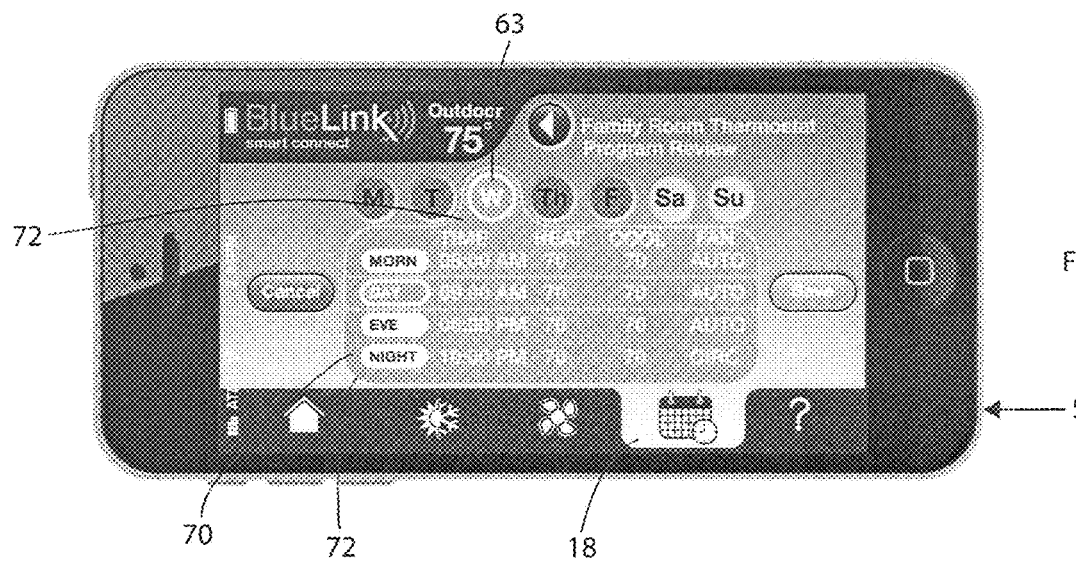

By selecting a single day of the week for example, Wednesday; the user can schedule that single day by pressing the "W" icon 63 and then selecting group 90. Turning to FIG. 3, it can be seen that the display changes to the setting mode and includes a table 70. The table 70 generally includes timing and set point temperature data for the user to customize the settings for the control program to operate the thermostat. In an alternate embodiment, the table 70 may be formatted in different ways and organized having different sequences of data from the display depicted in FIG. 3. FIG. 3 provides an example of a table format 70, which includes four segmented time periods providing a row for morning, day, evening and night. Following the row for the fourth segment of the day is a time setting row, the heat temperature mode, the cool temperature mode and the fan mode. Each of these functions can be adjusted when the user touches on each alphanumeric display in order to adjust each in turn.

The table 70 is surrounded by a graphical highlight 72. In the embodiment, depicted in FIG. 3, the highlight is a darker color than the main display area. In an embodiment, the graphical highlight 72 may be a color, such as orange. The graphical highlight 72 is linked to the icon for Wednesday 63. As in the previous step, the user had selected solely Wednesday as the day to be programmed and the graphical highlight 72 is linked the table to that sole selected day. In an embodiment, the graphical highlight 72 is a "bubble" that expands to encompass the Wednesday "W" icon 63. The "bubble" encompasses the table 70 that is being programmed for the day Wednesday. The bubble/graphical highlight provides a clear representation to the user which day of the week is being scheduled. In an alternate embodiment, the graphical highlight 72 linking the table to the day icon 63 could be an arrow or some other graphical indication that the day icon is linked with the table. The linking area 72a between the main graphical highlight 72 is the link to the day icon 63.

Figure 4:
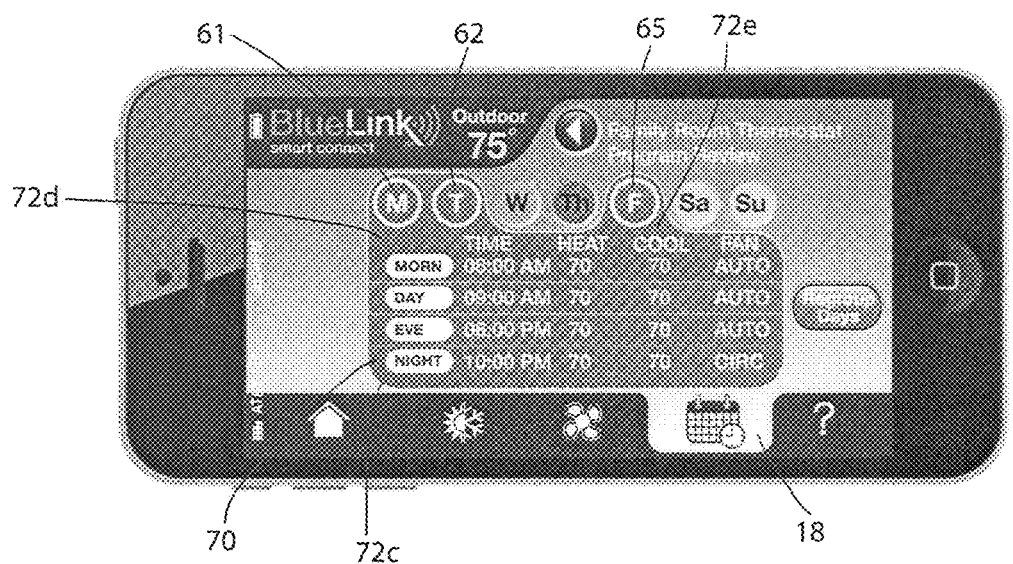

By way of another example, we will return to FIG. 2 where the seven day icons 61-67 appear. In another phase of programming, a user may wish to select multiple days for programming simultaneously. For example the user may select Monday, Tuesday and Friday as being days that should be programmed in a similar fashion. For example, for someone who works from home on Monday, Tuesday and Friday. By selecting the "M," "T" and "F" icons 61, 62, 65 the app will provide a display of FIG. 4. The table 70 is depicted in FIG. 4, surrounded by graphical highlight 72c which includes graphical highlight linking area 72d and 72e which link the table to the Monday, Tuesday, Friday icons 61, 62, 65. By use of the graphical highlight 72c, d, e the user is constantly reminded that the programming being made by adjustments of the table 70 are adjustments that will be uniform for the 3 days of the week: Monday, Tuesday and Friday.

Figure 5:
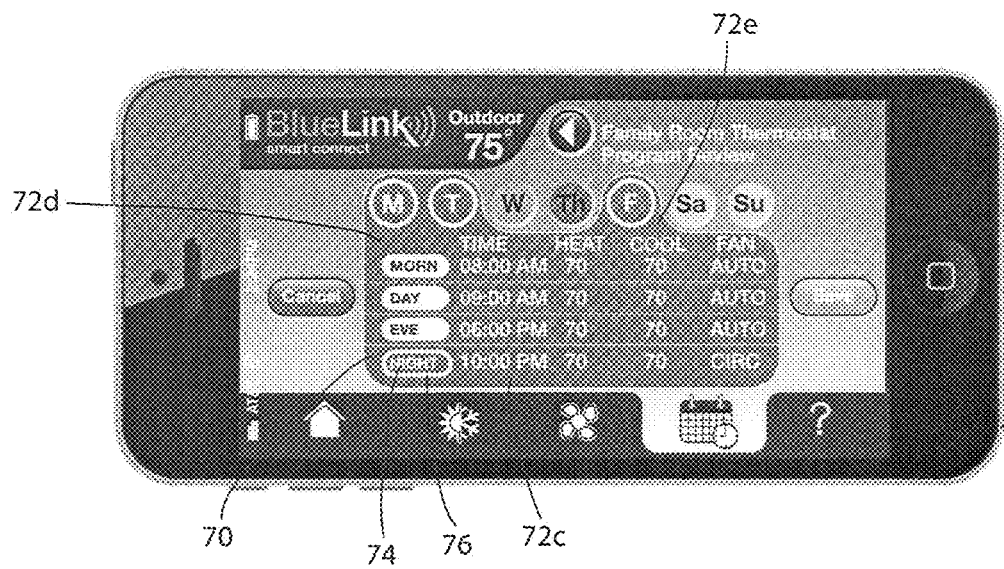

Upon display of the table 70, any of the parameters may be programmed by touching the alphanumeric displays. Turning to FIG. 5 it can be seen that the "NIGHT" function 74 has been selected because a graphical highlight 76, has been placed over the icon for "NIGHT". By displaying the graphical highlight 76 with the icon for "NIGHT" 74, the user is reminded that the night portion (or bottom row) of the table is being programmed. In an embodiment, the graphical highlight 76 has darker shading than the other four segmented portions of the day. For example, the icons for "MORN" "DAY" "EVE" have a contrasting background and the "NIGHT" graphical highlight is darker or a different color. It is noted that during the programming function, while the user may select a different time of day (e.g. MORN DAY EVE NIGHT), the graphical highlight 72 will continuously remain around the table and link to the day icons that were previously selected for the multiple programming step.

Figure 6:
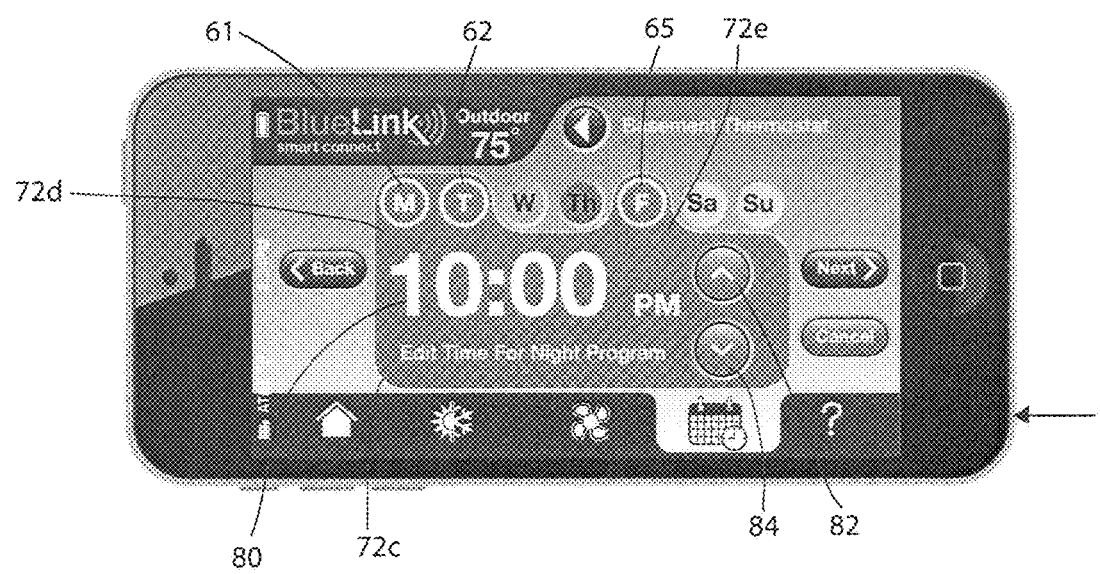

Selecting the "NIGHT" icon 74 will lead to the display of FIG. 6 where the time icon 80 is displayed. In this embodiment, the time icon 80 is designating 10:00 p.m. and facilitates editing and programming of the "Night" portion of the table 70. Although the table 70 has been replaced with the night time icon 80, the previous graphical highlight 72c continues to be displayed including the linking portion 72d that links the graphical highlight 72c to the multiple day icons: Monday Tuesday and Friday, 61, 62 and 65. The up/down buttons 82, 84 may be used to increment or decrement the time setting and allow the user to make the adjustments for the proper heat and cool settings at the proper time of day. Such programming will continue by selecting different portions from the table 70, until each of the desired settings at each of the times of day have been completed for the multiple day selection: Monday Tuesday and Friday.

Once the first group of days have had the heat and/or cool settings selected, the user will be returned to the main programming page as shown in FIG. 2, by selecting the Programming button 18. At that time the user may decide to complete the programming, for example by selecting Saturday and Sunday to schedule with uniform settings. It will be understood that during those programming functions the graphical highlight will link to the Saturday and Sunday icons 66, 67. Likewise, in order to complete the programming for a full week, the Thursday icon 64 will be depressed to provide for the programming on that day. As discussed above, the graphical highlight icon will link the table to the Thursday icon 64 during completion of the programming.

Figure 9:
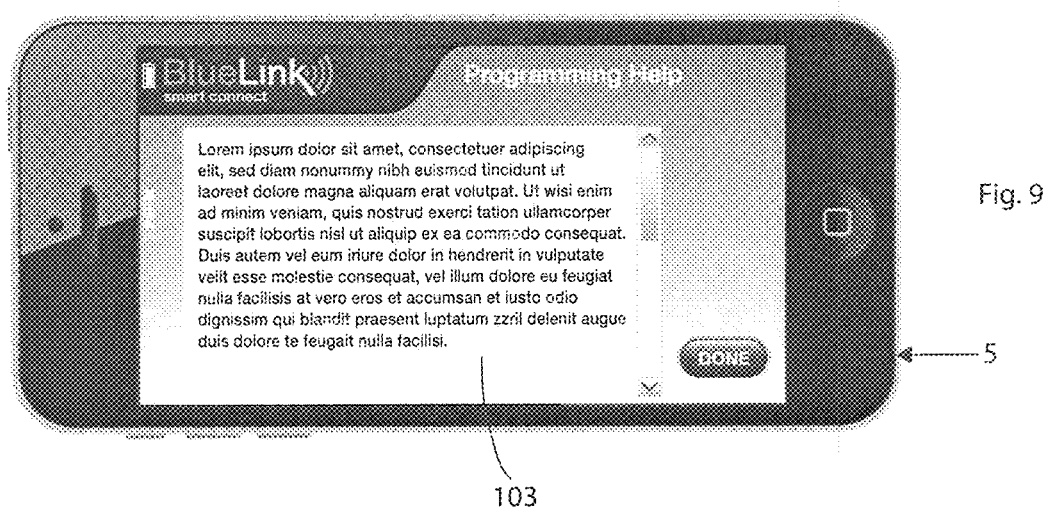
Figure 10:
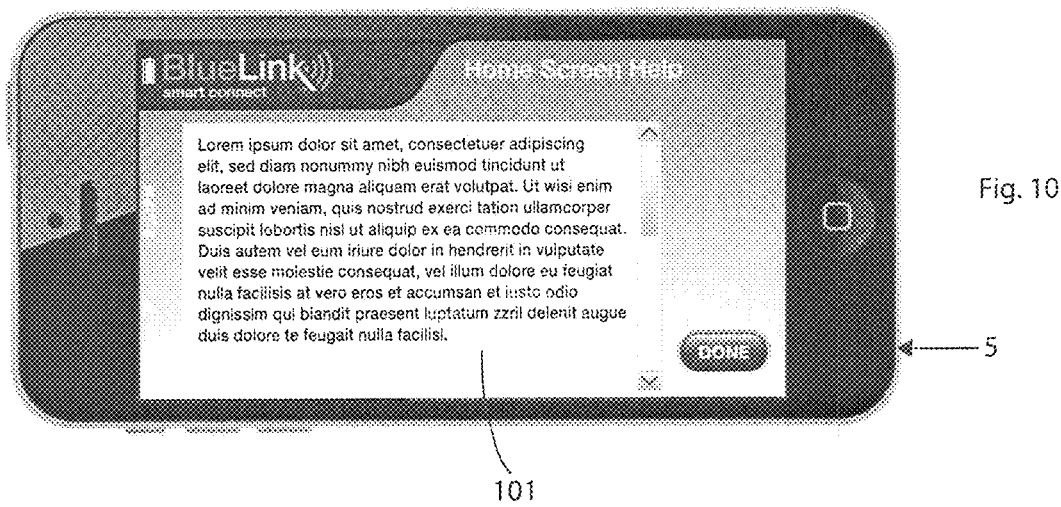

Turning to FIGS. 1 and 9-10, the feature of the "Help" button 20 will be discussed. The present invention provides preselected help screens based on a previous function selection by the user. For example, when in the Home mode, as shown in FIG. 1, if the Home icon 10 is selected, when a user subsequently selects Help mode by selecting the Help ("?") icon 20, the Home mode help screen 101 (FIG. 10) will automatically be displayed. The Home screen help display in FIG. 10, will depict specific instructions regarding help for the user regarding only the home mode. The direct display of the home screen help page 101 saves the user steps of having to scroll through the menu of alternate help pages. By displaying a specific help page based on the user's previous selection of the home mode much time savings is gained.

In another example, if the user is in the programming mode 18, and then selects the Help icon 20, the programming help screen 103 is depicted (FIG. 9). The programming help screen is limited to providing help instructions focused solely on the programming mode.

Figure 7:
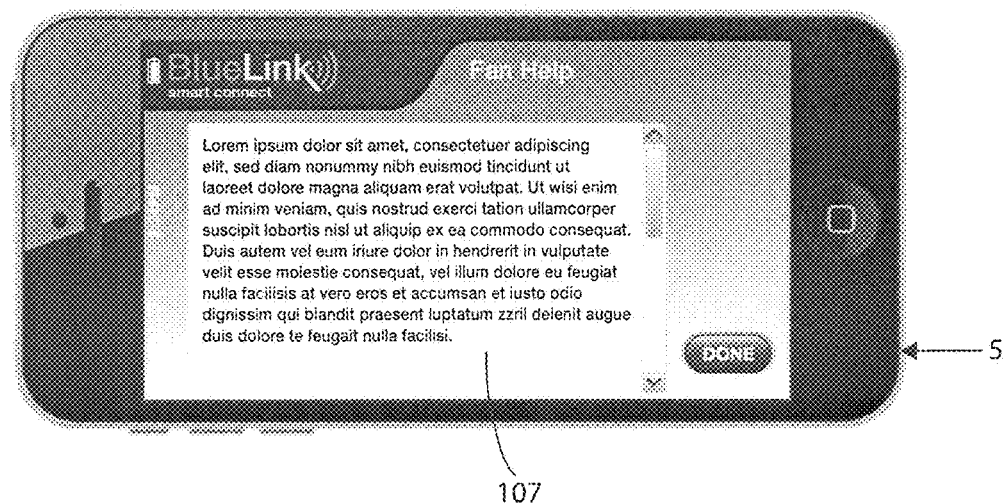
FIGS. 7-10 depict screen shots of help screens for an app for a climate control system.

Further, if the user is in Fan Mode having selected the fan icon 16, and then selects the Help mode by selecting Help icon 20, the fan help screen 107 depicted in FIG. 7 will appear. The fan help screen provides help instructions solely related to the fan mode.

Figure 8:
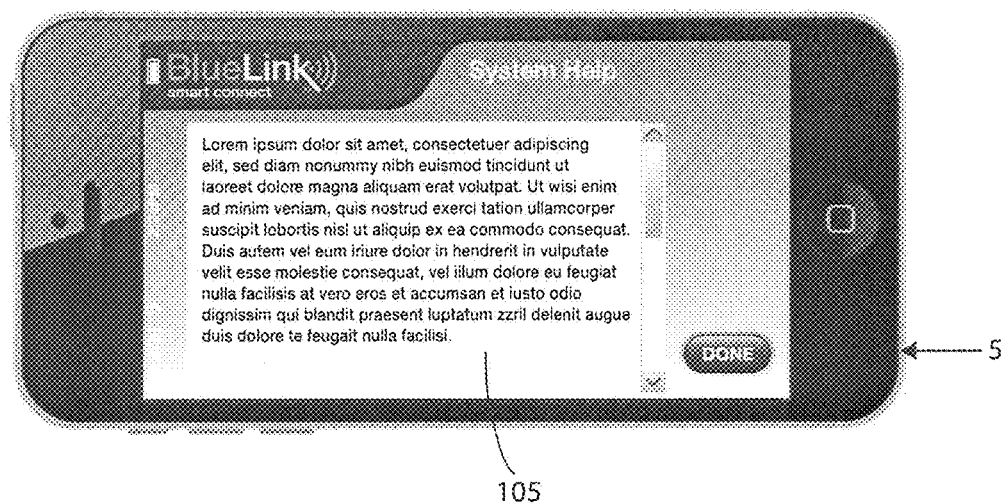

Finally, should the user be in the System mode after selecting the system icon 14, and subsequently selects the help icon 20, the System Help screen 105 displayed in FIG. 8. The System help screen 105 provides help instructions solely related to the System mode 14.

Figure 11:
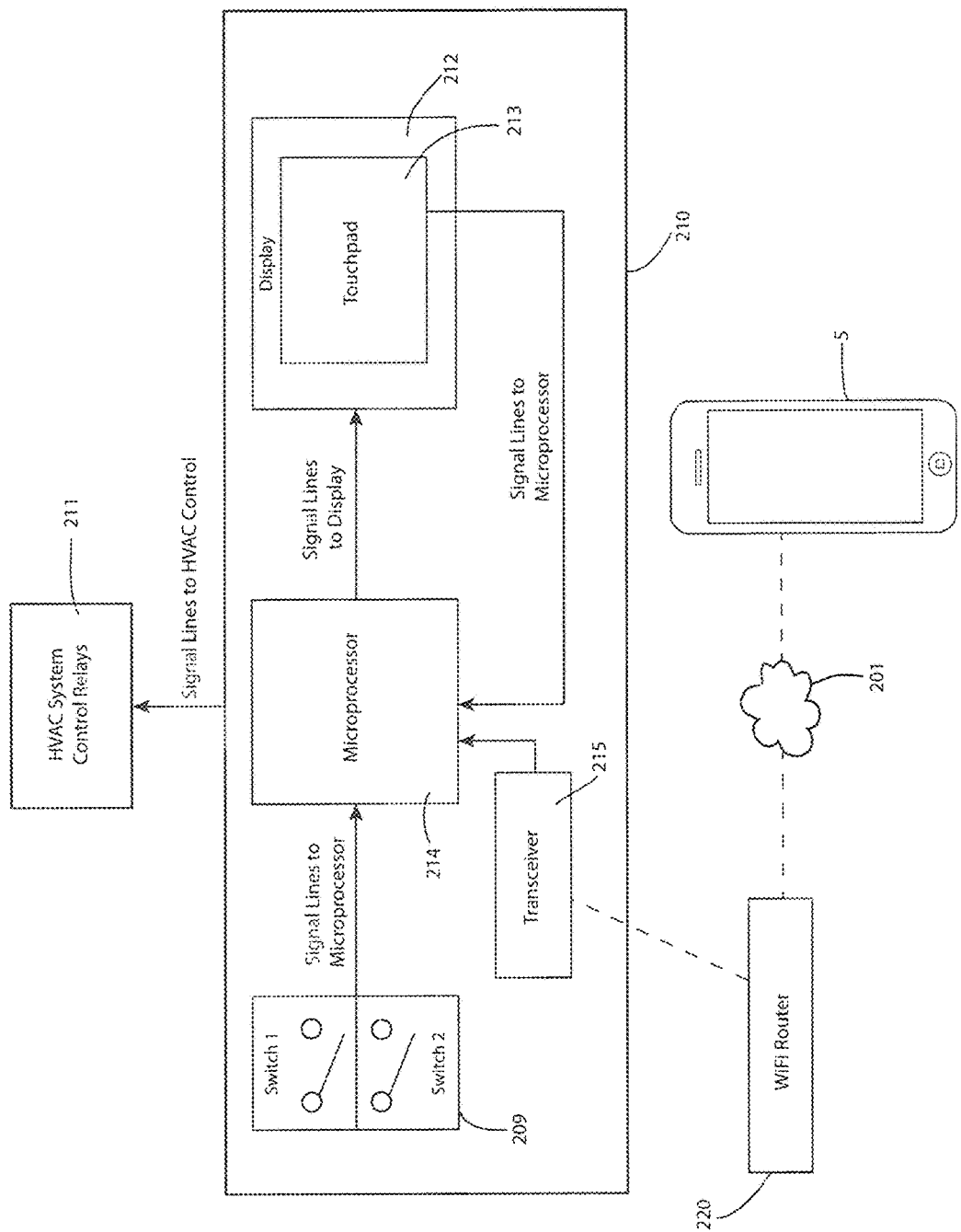
FIG. 11 is a schematic diagram of the climate control system of the present invention.

FIG. 11 depicts the network environment in which the invention operates. In an embodiment, the smartphone 5 links through the internet cloud (e.g. third party servers) to a (Wi-Fi) router 220 to a thermostat 210. The thermostat controls an HVAC system (and its relays) 211. The thermostat includes a mechanical, digital or analog switch 209, a microprocessor 214, display screen 212, touch pad area of the display 212 and a transceiver 215. These components operate the thermostat as is well known in the thermostat industry. Likewise, these components, in an alternate embodiment may control a humidifier, HVAC system, air damper, building environment control or climate control. Each of the above discussed operations (FIGS. 1-10) are carried-out by the microprocessor 214 receiving instructions from the smartphone 5.

An alternate embodiment of the invention will be described with respect to FIGS. 12-20. FIGS. 12-20 depict screen shots of the graphical user interface of the control display system. In an embodiment the control display system is an app loaded on a smartphone device 5 and each of the Figures for 12-20 depict a series of screen shots that illustrate the operation and programming of the climate control, building environment control, thermostat or humidifier of the present invention. Many of the features discussed with respect to FIGS. 12-20 are similar to the features and icons discussed previously with respect to FIGS. 1-9. For example, turning to FIG. 12 the smartphone 5 includes a navigation bar 12 which includes icons for Home 10, System Mode (heating, cooling) 14, Fan Mode 16, Programming Mode 18 and Help ("?") 20. The display also includes icons for a Fan 22 (shown in auto mode) Heat 24 (ON mode) temperature set point icon 26 (72 degrees Fahrenheit) outdoor temperature icon 28 (75 degrees Fahrenheit) thermostat identification 30 ("family room thermostat") room temperature icon 32 (currently at 70 degrees Fahrenheit) and humidity icon 34 (currently 40% humidity).

The alternate embodiment described in FIGS. 12-20 also includes a Help button on the Navigation bar 12. The Help button 20 operates in the same way as discussed with respect to previous embodiments for FIGS. 5-7 above and will automatically generate a screen describing help guidance with respect to the operation being undertaken by the user at the time the Help button 20 is selected.

Figure 12:
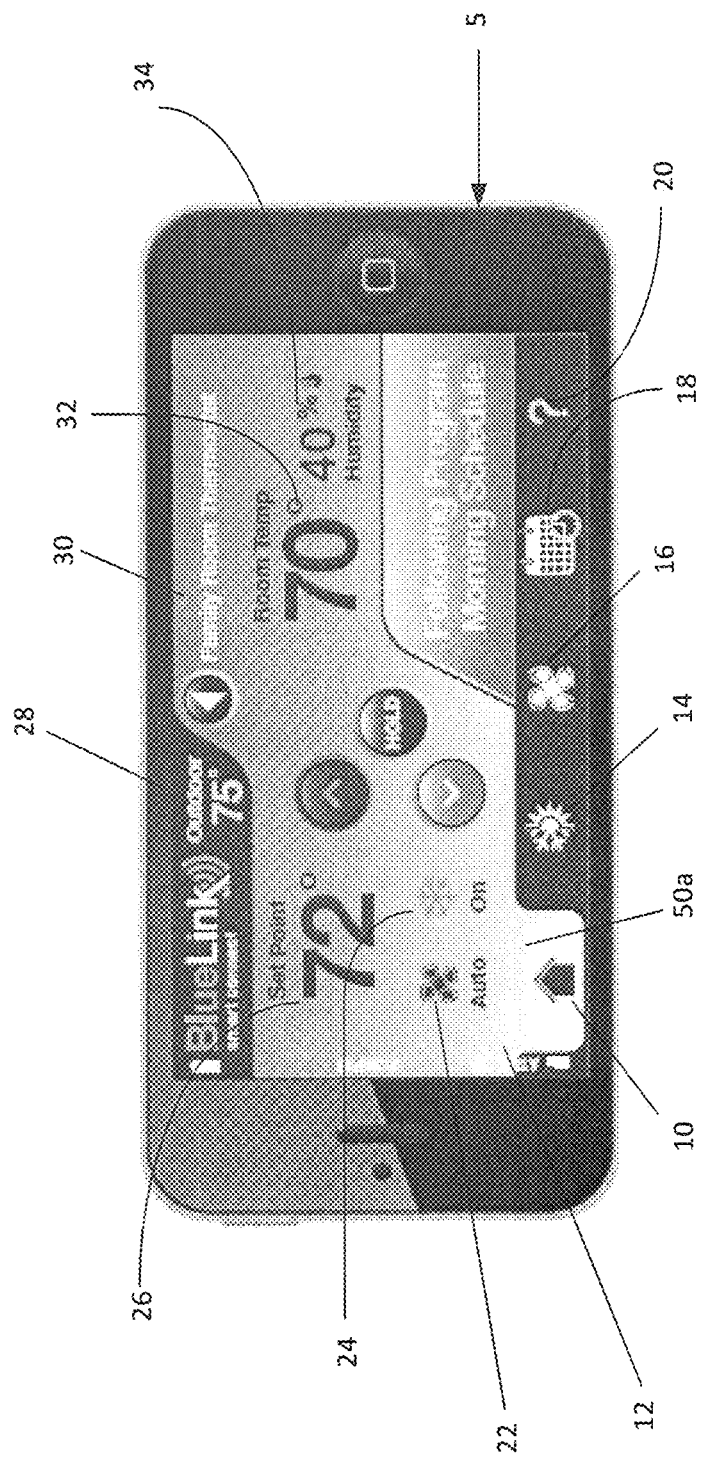
FIGS. 12-20 are screen shots of an app for controlling a climate control of an alternate embodiment of the invention.
Figure 13:
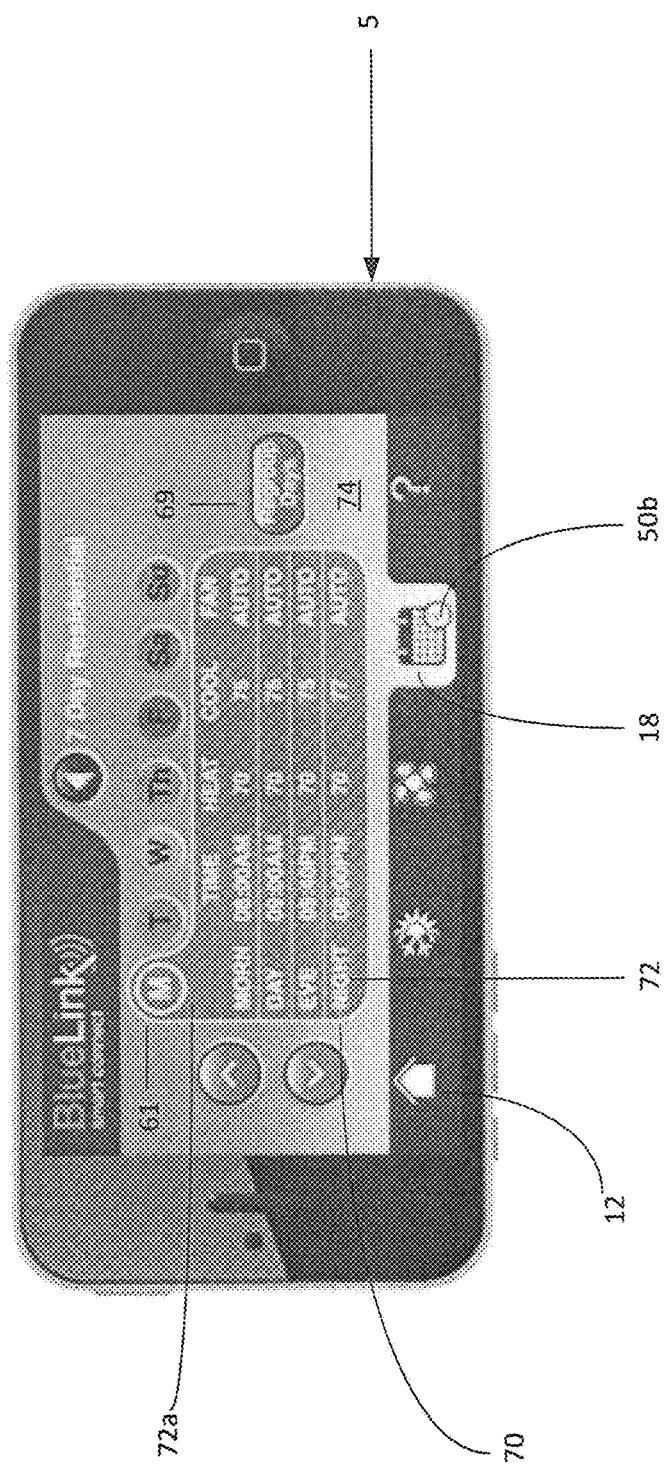

The invention is discussed further with respect to the selection of the programming function identified by icon 18. In FIG. 12 the Home Mode has been selected as indicated by the light color of 50a, in contrast to the rest of the navigation bar 12. Turning to FIG. 13, selection of the Programming Mode occurs by pressing Programming icon 18 and 50b will be modified to a light color in contrast to the rest of the navigation bar 12. 50b provides a graphical interface cue that identifies to the user of the control display that the Programming Mode has been selected. In particular, the graphical interface cue 50a was eliminated from the area surrounding Home icon 10 and the graphical interface cue 50b is displayed at the Programming icon 18. By selecting the Programming mode 18, the main screen also is modified from that depicted in FIG. 12; to display the table 70. In an embodiment the table generally depicts timing and set point temperature data to manually customize the settings for the control program to operate a thermostat, humidifier, climate controller or building environment control (hereinafter "climate control").

In an embodiment, the table 70 is separated into: Time, Heat, Cool, Fan columns and each column is divided into rows for Morning, Day, Evening, Night ("MORN," "DAY," "EVE," "NIGHT"). However the invention could allow for any organization of alpha numeric symbols on a table that allow for programming of a climate control.

As depicted in FIG. 13 the table 70 includes a graphical highlight 72. In the embodiment depicted the graphical highlight 72 is provided in a manner to contrast with the main display area 74. For example the graphical highlight pattern may be darker then the main display area 74. In an alternate embodiment, the graphical highlight pattern 72 may be a different color than the main display area 74 or other icons displayed on the main display area 74.

In FIG. 13 the graphical highlight pattern 72 is linked to the day of the week icon for Monday ("M"). A linking area 72a is provided between the main graphical highlight pattern 72 and the icon for Monday 61. The icon for the day of the week is a circle with the alpha numeric "M" provided within the circle. The linking area 72a surrounds the circle icon 61 and connects to the graphical highlight pattern 72. As a result of the linking of the day of the week icon 61 to the graphical highlight pattern 72 a user can quickly understand that the set point adjustments that can be accomplished using the table 70 will affect the operation of the climate control on Mondays. In addition, the graphical highlight pattern 72 may have the same color as the day of the week icon 61. For example, the graphical highlight pattern 72 and the day of the week icon 61 may both be navy blue. These colors for the day of the week icon 61 and the graphical highlight pattern 72 are in contrast to the other day of the week icons and the main display area 74 and other buttons in the main display area 74 of the control.

Figure 14:
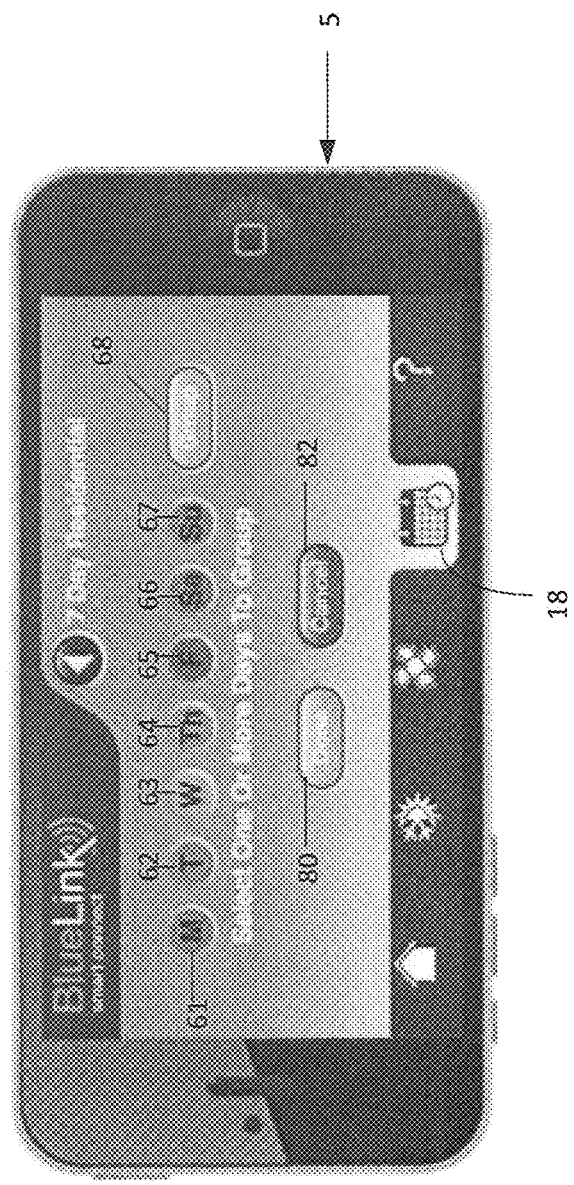

The regroup function of the present invention will now be described with respect to FIGS. 13-15. With respect to FIG. 13, upon selection of the Regroup Days button 69, the display will be altered from the screen-shot depicted in FIG. 13 and adjusted to the screen-shot in FIG. 14. In FIG. 14, the table has been eliminated and the day of the week icons are presented as M, T, W, TH, F, SA, SU 61-67. Also displayed are the Group button 68, the Done button 80 and Cancel button 82. In an embodiment, the day of the week icons 61-67 are displayed having graphical characteristics that distinguish each of the seven (7) day of the week icons. In an embodiment, each of the day of the week icons 61-67 may be a different color. In an alternate embodiment, each of the day of the week icons 61-67 may have a different geometric shape. By distinguishing each of the day of the week icons 61-67 using a distinct graphic highlight, it is easier for a user to distinguish between each of the seven (7) days. As indicated on the display of FIG. 14 of the smart phone 5, the user is prompted to "select one or more days to group." As was discussed with respect to FIG. 13 the previous grouping was for each of the days of the week separately. For example, each day of the week was to be programmed using the table 70 for each day of the week. Such a cumbersome and slow process would require modification to seven different data input tables 70 to accommodate the programming of the set points for each individual day of the week. However, the present invention provides for the grouping of days of the week to shorten the programming time, so that the table 70 may be used a single time to program multiple days of the week that are grouped together with a single programming operation.

Figure 15:
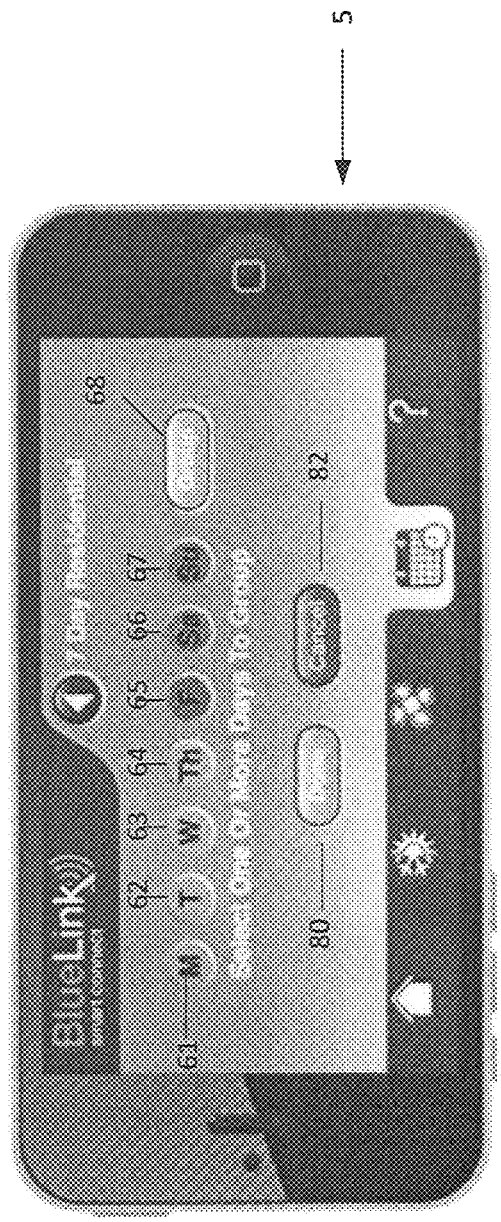

Turning to FIG. 15, days of the week icons 61-64 depict that Monday, Tuesday, Wednesday and Thursday icons have been selected. In this embodiment, the selection of day of the week icons 61-64 has occurred by displaying a first indicia to denote a $1^{st}$ group. For example, the day of the week icons 61-64 may have a shading surrounding the icon that is a different intensity than the remaining day of the week icons 65-67. And in another embodiment, the indicia for the first group selected 61-64 may be a different color than the remaining day of the week icons 65-67. In an embodiment, the first indicia may be the color orange and each of the geometric shapes for the day of the week icon 61-64 may be orange and the second indicia for day of the week icon 65 may be red. The third indicia for the day of the week icons 66 and 67 may be green. Therefore, with screen shot of FIG. 15 it may be understood that the first indicia indicate that the first group of day of the week icons Monday, Tuesday, Wednesday, Thursday 61-64 will be programmed separately from the Friday day of the week icon that has a second indicia for the icon 65. The third indicia identifying Saturday and Sunday denotes as a third group for programming those day of the week icons 66-67.

In order to begin the operation of grouping of the day of the week icons, the Group button 68 is depressed (FIG. 14). Thereafter the preferred day of the week icons 61-67 are depressed to select a group of days of the week that are to be programmed together. Following the selection of the groupings of the day of the weeks the Done button 80 is selected. In a case where a mistake is made or the user has changed their preference, the Cancel button 82 may be used to start over. After selecting the Cancel button 82 the user would select the Group button 68 and then select the day of the week icons 61-67 preferred to be organized into groups. Once the Regrouping or Grouping has been accomplished, the user selects the Done button 80.

Figure 16:
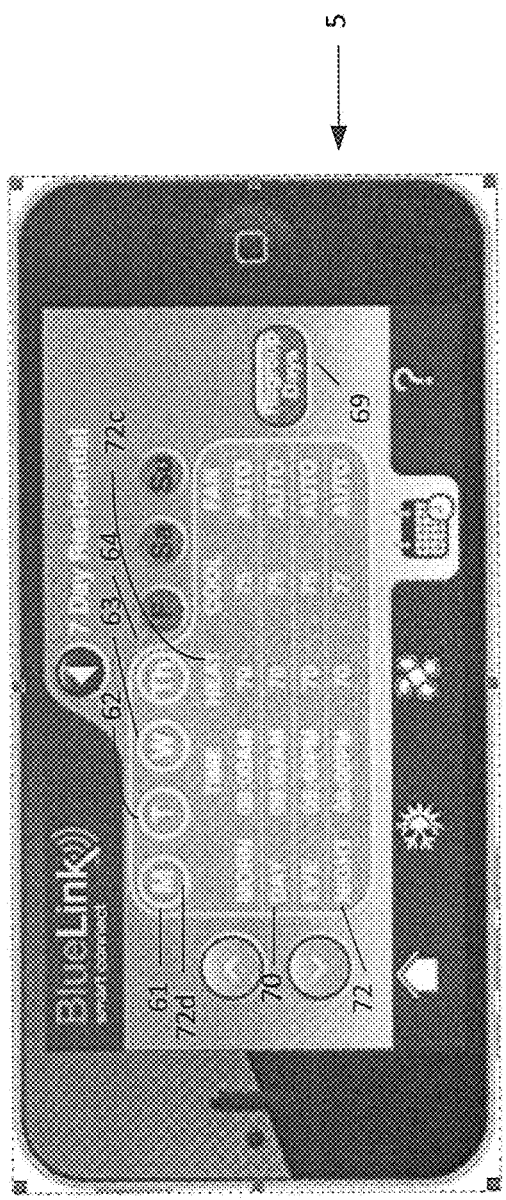

Turning to FIG. 16, the Regrouped or Grouped day of the week icons and the programming table are clearly denoted by the graphical highlight pattern 72. The graphical highlight linking area 72c, 72d links the graphical highlight pattern 72 of the table 70 to the grouped day of the week icons 61, 62, 63, 64. Just as the user had selected in the previous step (as shown in FIG. 15) the day of the week icons 61-64 will be programmed together. The graphic highlight pattern 72 is indicating such grouping and the use of the table 70 to program simultaneously Monday, Tuesday, Wednesday and Thursday can be easily accomplished and understood by the user based on the display of FIG. 16. By selecting the alphanumeric icons displayed on the table 70, the user can modify the set point times and temperatures rapidly for each of the days of the week: Monday, Tuesday, Wednesday, Thursday using a single adjustment operation. The graphical highlight linking areas 72c and 72d, link the group of day of the week icons 61-64 to the table and the graphical highlight pattern/bubble 72. The processor of the smartphone that operates the app will automatically link the selected day of the week icons with the bubble of the graphical highlight pattern.

Turning back to FIG. 13, it is made clear when comparing the graphical highlight pattern 72 in FIG. 13 with the graphical highlight pattern 72 in FIG. 16, that the pattern has been altered and the concept of a free-flowing bubble that moves and adjusts with respect to the selected day of the week icon or other icon. The bubble in FIG. 13 merely connects to the day of the week icon 61 for Monday. The bubble in FIG. 16 has been adjusted to expand and connect to the four day of the week icons 61-64 for Monday, Tuesday, Wednesday, Thursday.

The term "bubble" can be used to describe a graphical highlight pattern that adjusts to surround a table of any geometric shape and link to a geometric shape of a day of the week icon or other icon. For example, in FIG. 16 the day of the week icons are circles. Therefore it is understood that the bubble 72, when surrounding the day of the week icon 61 presented by a circle, forms a concentric radius adjacent to the day of the week icon 61. For example, the day of the week icon 61 circle, may be considered as the face of the clock. At the 11:00 position the bubble and the portion of the circle forming the icon for the day of the week (Monday) form concentric radiuses at that portion (11:00). Likewise for the day of the week icon 64 for Thursday at the 2:00 position for the circle surrounding the day of the week icon 64 and the bubble at that portion form concentric radiuses at the linking area 72c.

As the days of the week that have been grouped in FIG. 16 are consecutive days Monday, Tuesday, Wednesday, Thursday it is understood that the bubble has a straight line when extending from the first day of the week icon 61 to the fourth day of the week icon 64. As the linking area 72d links the day of the week icon which are aligned generally adjacent to a side of the table 70 the graphical highlight pattern provides a linking area that extends along the side of the table 70 forming connecting area 72c and 72d as depicted in FIG. 16.

In contrast, turning back to FIG. 13, the bubble that surrounds the day of the week icon 61 has a concentric radius going around the circle for the icon 61 that extends from the 11:00 to the 2:00 position for the icon 61. Since only a single day of the week icon 61 was selected and the linking area 72a for the bubble 72 only surrounds the first day of the week icon 61 (FIG. 13) and none of the other day of the week icons are grouped with the first day of the week icon 61, the bubble 72 forms a tighter shadow pattern around the single selected day of the week icon 61 at the linking area 72a (as compared to FIG. 16).

The operation of the adjustment of the set point temperature and times for the climate control are achieved by modifying the data in the table 70. While the modification of the time and temperature settings in the table 70 occur, the bubble 72 remains static as the operation for changing the time and temperature continue to occur for each of the four days of the week Monday, Tuesday, Wednesday, Thursday with respect to the grouping provided by FIG. 16. In an alternate embodiment the table may be modified and alternate between time and temperature parameters.

Figure 17:
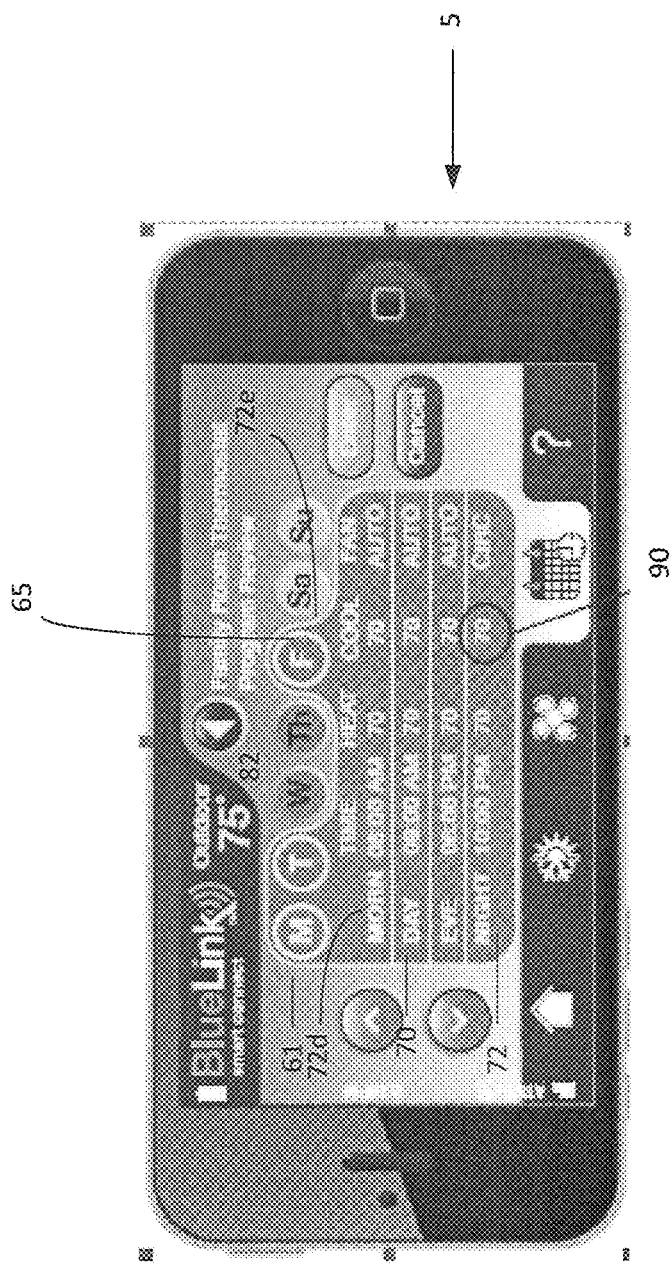

Turning to FIG. 17, the process of adjusting the set points for time and temperature will be discussed. As shown in FIG. 17 the day of the week selection from FIG. 16 have been regrouped. Instead of a first group of Monday, Tuesday, Wednesday, Thursday as shown in FIG. 16 the second group is Monday, Tuesday, Friday as shown in FIG. 17. It can be seen that the graphic highlight pattern 72 is linked to the day of week icons 61, 62 and 65. The linking area 72d provides for the day of the week icons 61, 62 to be linked with the graphic highlight pattern 72. The linking portion 72e links the day of the week icon 65 with the graphic highlight pattern 72.

The bubble 72 clearly encompasses Monday, Tuesday, Friday as the group of day of the week icons 61, 62, 65 that are being programmed, the user can quickly program that grouping of days of the week by selecting alphanumeric icons on the table 70. For example, if the user would like to adjust the cooling set point for night time segment, the icon 90 is selected on the table 70. By pressing on the alphanumeric (70) under the column Cool in the row Night the selecting of the icon 90 results in a graphical highlight pattern to identify the segment of the table being adjusted.

Figure 18:
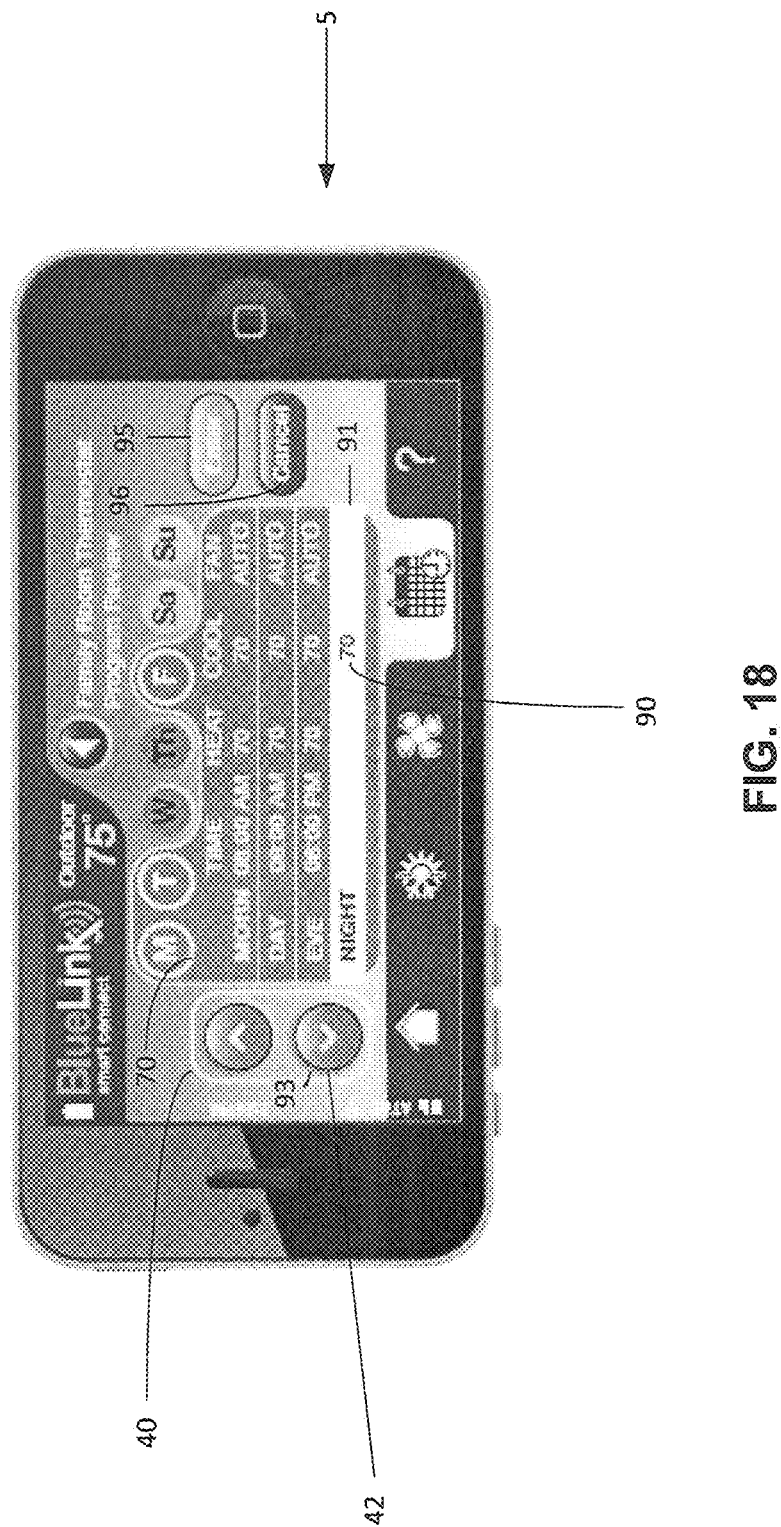

Turning to FIG. 18, it can be seen that the Night segment (row) of the table 70 has a graphical highlight pattern 91. In the embodiment depicted in FIG. 18, the segment of the table 70 has been provided with a contrasting background as compared to the other portions of the table. In particular, the row for Night has been provided as a white color, defining the graphical highlight pattern 91 for that section of the table. In addition, the graphical highlight pattern has omitted the alphanumeric data except for the Selected icon. As the user previously selected icon 90 to adjust the temperature for the cooling function at night, the other alphanumeric icons for the Night segment of the table 70 had been suppressed and covered by the graphical highlight pattern 91.

An additional graphical highlight pattern 93 is displayed on the screen to designate the next step a user needs to take to decrement or increment the set point. In an embodiment the graphical highlight pattern 93 is an outline that circumscribes the increment and decrement buttons 40, 42. In an embodiment, the graphical highlight pattern 91 is similar to the graphical highlight pattern 93, in that they are the same color.

So for example, as shown in example 18, the first graphical highlight pattern 91 is white and the second graphical highlight pattern 93 is a white outline. The use of the dual graphical highlight patterns on the display 5, easily allow the programmer to understand that the selected icon 90 may be decremented or incremented by using the buttons 40, 42 as they have been highlighted by the use of the second graphical highlight pattern 93. The up arrow 40 increments the temperature set point 90 and the down arrow 42 decrements the temperature set point 90.

Figure 19:
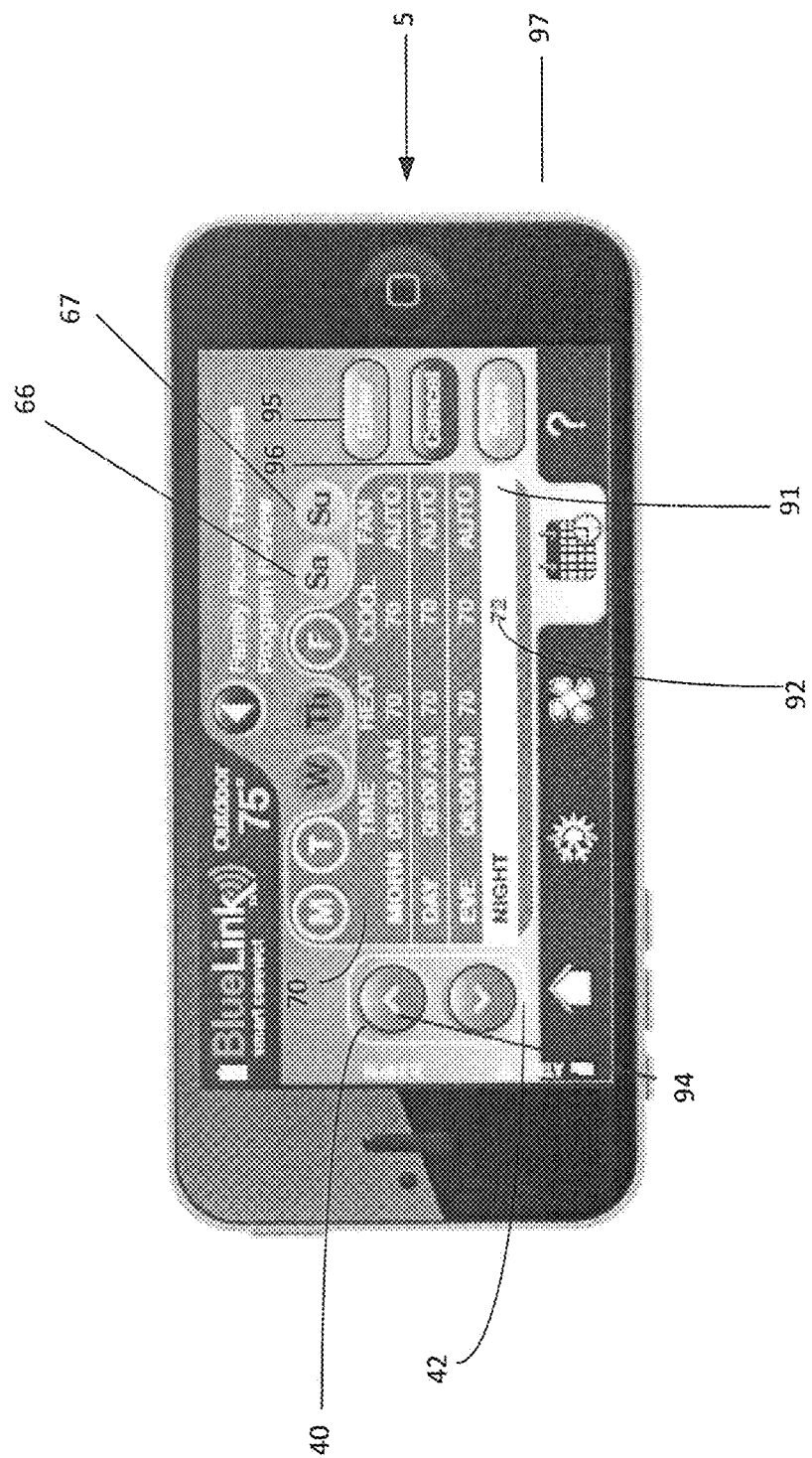
Figure 20:
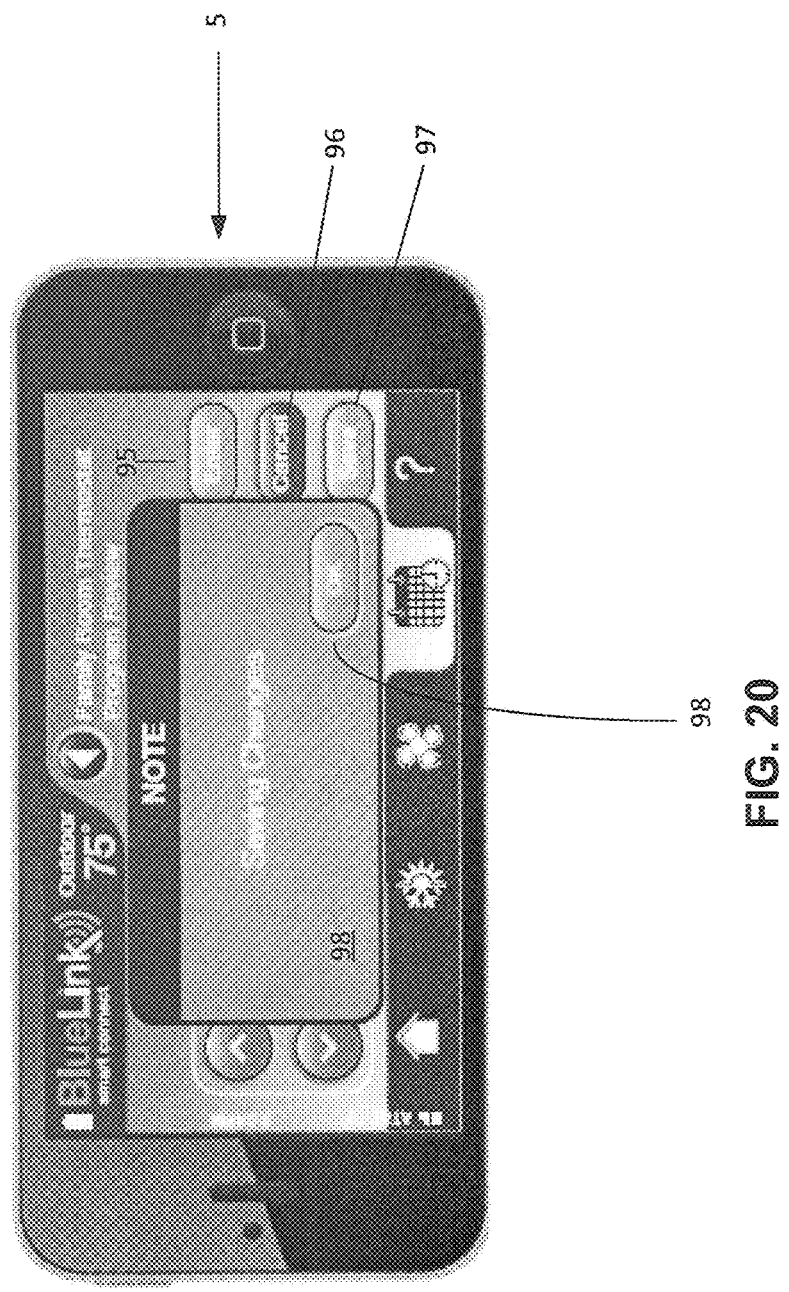

Turning to FIG. 19, it can be seen that the set point of 70 degrees has been altered to 72 degrees and the new icon 92 appears in the Night segment of the table that is highlighted by the graphical highlight pattern 91. The set point of 72 degrees was adjusted by touching the up arrow 40 twice. Once the user is satisfied that 72 degrees is the desired set point for the cool function at night, the Save button 97 is pressed. As shown in FIG. 20, a pop-up window appears indicating that the building environment control is saving the changes. The user then selects the OK button 98 in order to advance to the next programming step. It is to be understood that the sequence of modifying the alphanumeric data in the table 70 is repeated for each of the set point time and temperatures that the user desires to be modified and that each of those set point adjustments will occur for all three days Monday, Tuesday and Friday (as that is the grouping that was selected as shown in FIG. 19).

FIG. 19 also depicts Saturday and Sunday day of the week icons 66, 67 being grouped together, as they have the same color or shading indicia to indicate they are in a group. And upon selection of one of the day of the week icons 66 or 67, the bubble of the table 70 will adjust to link to the Saturday and Sunday day of the week icons 66, 67 and programming of those days as a group may occur as discussed above. Thereafter, the programming of the other days of the week may occur for Wednesday (icon 63, FIG. 14) by itself by using the adjustment of the alphanumeric data on the table 70. And finally Thursday (icon 64, FIG. 14) set points may be adjusted according to the above discussed process.

The following programming code, in one embodiment, provides for the rendering of the graphical highlight pattern of the present invention. This code is only an example and many other means of coding for the graphical highlight pattern are known to those of skill in the art to support the present invention.

```
//Braeburn day group and color in day_selection
//program_review
//modify the style when click "day" in program_review page
function review_select_day( )
{
    $('.col_14jia').on(myclick, function( ) {
        if ($(this).hasClass('day_select'))
            return false;
        if ($('#period0').length > 0) {
            build_program_review(this.id);
        }
        if ($('#txt_dpc_program_change_value').length > 0) {
            console.log("test_before temp id = " + this.id);
            AC.clearDayProgramChangeData( );
            //AC.alertCleanScheduleData(this.id);
            //return false;
            // build_day_program_change(this.id, 'time');
        }
        var old_select = $('.day_select');
        var day_table = $('.day_table');
        if (old_select.length > 0) {
            var old_day = old_select.data('day');
            var old_color = get_day_color(old_day);
            var old_day_select = old_select.find('.day_default');
            //old_day_select.css('background-color', '#fff');
            old_day_select.css('color', '#221e1f');
            old_day_select.prev( ).removeClass('day_default_bg_white');
            //old_day_select.css('border-color', old_color);
            $('.day_radius').removeClass('radius_top radius_top_left radius_top_right
radius_top_left_right radius_bottom_left radius_bottom_right radius_bottom_left_right');
            $('.day_radius0').removeClass('radius_left radius_right');
            $('.day_radius').css('background-color', 'transparent');
            $('.day_radius0').css('background-color', 'transparent');
            $('.day_radius1').css('background-color', 'transparent');
            day_table.removeClass('header_radius_top_right header_radius_top_left');
            old_select.removeClass('day_select');
        }
        var new_day = $(this).data('day');
        if ($('#day_program_change_nowvalue').length > 0) {
```

```
      change_program_review_up_down_color(new_day, 1);
    } else {
      change_program_review_up_down_color(new_day, '');
    }
    if ($('#period0').length > 0) {
      build_program_review(this.id);
    }
    if ($('#txt_dpc_program_change_value').length > 0) {
      // build_day_program_change(this.id, 'time');
    }
    var new_color = get_day_color(new_day);
    var new_select = $(".col_14jia[data-day=" + new_day + "]");
    var new_day_select = new_select.find('.day_default');
    //new_day_select.css('background-color', new_color);
    new_day_select.css('color', '#fff');
    new_day_select.prev( ).addClass('day_default_bg_white');
    //new_day_select.css('border-color', '#fff');
    new_select.addClass('day_select');
    day_table.css('background-color', new_color);
    var i = 0, body_background_color = '#3ABAE0';
    new_select.each(function(j) {
      var current = $(this);
      var prev = current.prev( );
      var next = current.next( );
      if (prev.hasClass('day_select') && next.hasClass('day_select')) {
        current.find('.day_radius').addClass('radius_top');
      }
      if (prev.hasClass('day_select') && !next.hasClass('day_select')) {
        current.find('.day_radius').addClass('radius_top_right');
        next.find('.day_radius').addClass('radius_bottom_left');
        next.find('.day_radius').css('background-color', body_background_color);
        next.find('.day_radius0').css('background-color', new_color);
        //next.find('.day_radius1').css('background-color', body_background_color);
      }
      if (!prev.hasClass('day_select') && next.hasClass('day_select')) {
        current.find('.day_radius').addClass('radius_top_left');
        prev.find('.day_radius').addClass('radius_bottom_right');
        prev.find('.day_radius').css('background-color', body_background_color);
        prev.find('.day_radius0').css('background-color', new_color);
        //prev.find('.day_radius1').css('background-color', body_background_color);
      }
      if (!prev.hasClass('day_select') && !next.hasClass('day_select')) {
        current.find('.day_radius').addClass('radius_top_left_right');
        prev.find('.day_radius').addClass('radius_bottom_right');
        next.find('.day_radius').addClass('radius_bottom_left');
        prev.find('.day_radius').css('background-color', body_background_color);
        prev.find('.day_radius0').css('background-color', new_color);
        //prev.find('.day_radius1').css('background-color', body_background_color);
        next.find('.day_radius').css('background-color', body_background_color);
        next.find('.day_radius0').css('background-color', new_color);
        //next.find('.day_radius1').css('background-color', body_background_color);
      }
      if (prev.find('.day_radius').hasClass('radius_bottom_left radius_bottom_right')) {
        prev.find('.day_radius').removeClass('radius_bottom_left radius_bottom_right');
        prev.find('.day_radius').addClass('radius_bottom_left_right');
      }
      if (current.attr('id') === 'day_2' && !prev.hasClass('day_select')) {
        prev.find('.day_radius1').addClass('day_radius1_50left');
        prev.find('.day_radius1').css('background-color', body_background_color);
      }
      if (current.attr('id') === 'day_6' && !next.hasClass('day_select')) {
        next.find('.day_radius1').addClass('day_radius1_50right');
        next.find('.day_radius1').css('background-color', body_background_color);
      }
      if (i === 0 && prev.length === 0) {
        current.find('.day_radius0').addClass('radius_left');
        day_table.addClass('header_radius_top_right');
      }
      if (i === j && next.length === 0) {
        current.find('.day_radius0').addClass('radius_right');
        day_table.addClass('header_radius_top_left');
      }
      current.find('.day_radius').css('background-color', new_color);
      current.find('.day_radius0').css('background-color', new_color);
      i += 1;
    });
  });
}
```

Numerous variations and modifications will become apparent to those skilled in the art once the above disclosure is fully appreciated. It is intended that the claims be interpreted to embrace all such variations and modifications.

What is claimed:

1. A method for programming a thermostat, said method performed within an electronic control device and comprising:
   1) displaying a set of operation modes on a display screen of said electronic control device, said set of operation modes including a programming mode, said electronic control device having a microprocessor, a memory, a wireless transceiver, and a display screen, said electronic control device adapted to communicate with said thermostat over said wireless transceiver, said thermostat adapted to control an environment regulation system;
   2) in response to selection of said programming mode, displaying a programming calendar including a set of seven day-of-a-week icons in a first orientation, a set of set point categories in said first orientation, a set of time segments in a second orientation being different from said first orientation, a set of set points including a subset of set points corresponding to each set point category in said second orientation, and a graphical highlighter linking and enclosing a first set of grouped days within said set of seven day-of-a-week icons, said set of time segments, said set of set point categories, and said set of set points, wherein:
      a. said set of set point categories includes a time category, a heat category and a cool category;
      b. values of said set points are applicable to all days within said first set of grouped days; and
      c. each day-of-a-week icon within said set of seven day-of-a-week icons that is not within said first set of grouped days is not enclosed within said graphical highlighter;
   3) when a set point within said set of set points corresponding to said time category and a first time segment within said set of time segments is selected, displaying a time adjusting control within said graphical highlighter for adjusting a value of said selected time set point, wherein:
      a. said graphical highlighter when said set of set points are displayed is the same as that when said time adjusting control is displayed;
      b. said graphical highlighter continues to enclose said first set of grouped days when said time adjusting control is displayed; and
      c. each day-of-a-week icon within said set of seven day-of-a-week icons that is not within said first set of grouped days is not enclosed within said graphical highlighter when said time adjusting control is displayed; and
   4) when a set point within said set of set points corresponding to said cool category and a second time segment within said set of time segments is selected:
      a. displaying a present value of said selected cool set point within said graphical highlighter; and
      b. displaying a first second-tier graphical highlighter corresponding to said second time segment in said first orientation within said graphical highlighter, said first second-tier graphical highlighter highlighting said selected cool set point and said second time segment, said first second-tier graphical highlighter suppressing each set point within said set of set points that corresponds to said second time segment other than said selected cool set point, wherein:
         i. said present value of said selected cool set point is adjusted through an up adjustment control or a down adjustment control;
         ii. said graphical highlighter when said set of set points are displayed is the same as that when said selected cool set point is selected for adjustment;
         iii. said graphical highlighter continues to enclose said first set of grouped days when said selected cool set point is selected for adjustment; and
         iv. each day-of-a-week icon within said set of seven day-of-a-week icons that is not within said first set of grouped days is not enclosed within said graphical highlighter when said selected cool set point is selected for adjustment.

2. The method of claim 1 further comprising, when a set point within said set of set points corresponding to said heat category and a third time segment within said set of time segments is selected:
   a. displaying a present value of said selected heat set point within said graphical highlighter; and
   b. displaying a second second-tier graphical highlighter corresponding to said third time segment in said first orientation within said graphical highlighter, said second second-tier graphical highlighter highlighting said selected heat set point and said third time segment, said second second-tier graphical highlighter suppressing each set point within said set of set points that corresponds to said third time segment other than said selected heat set point, wherein:
      i. said present value of said selected heat set point is adjusted through said up adjustment control or said down adjustment control;
      ii. said graphical highlighter when said set of set points are displayed is the same as when said selected heat set point is selected for adjustment;
      iii. said graphical highlighter continues to enclose said first set of grouped days when said selected heat set point is selected for adjustment; and
      iv. each day-of-a-week icon within said set of seven day-of-a-week icons that is not within said first set of grouped days is not enclosed within said graphical highlighter when said selected heat set point is selected for adjustment.

3. The method of claim 1 wherein said set of set point categories further includes a fan category.

4. The method of claim 1 wherein said first orientation is horizontal, said second orientation is vertical, and said set of set point categories, said set of time segments, and said set of set points form a table structure.

5. The method of claim 1 further comprising
   1) displaying a regroup control;
   2) in response to selection of said regroup control, displaying a day selection control allowing a user to select any subset of said set of seven day-of-a-week icons to form a second set of grouped days;
   3) displaying a group control; and
   4) in response to selection of said group control, displaying said programming calendar with said graphical highlighter adjusted to only enclose said second set of grouped days.

6. The method of claim 5 further comprising, when a day-of-a-week icon not within said second set of grouped days is selected, displaying said programming calendar with said graphical highlighter adjusted to only enclose a third set of grouped days within said set of seven day-of-a-week icons, wherein said third set of grouped days includes said selected day-of-a-week icon.

7. The method of claim 1 further comprising, when a day-of-a-week icon not within said first set of grouped days is selected, displaying said programming calendar with said graphical highlighter adjusted to only enclose a second set of grouped days within said set of seven day-of-a-week icons, wherein said second set of grouped days includes said selected day-of-a-week icon.

8. The method of claim 7 wherein said set of set point categories further includes a fan category, said first orientation is horizontal, said second orientation is vertical, and said set of set point categories, said set of time segments, and said set of set points form a table structure.

9. The method of claim 8 wherein said set of time segments includes a morning time segment, a day time segment, an evening time segment and a night time segment.

10. A method for programming a control device for controlling building environmental control systems, said method performed within an electronic control device and comprising:
 1) displaying a set of operation modes on a display screen of said electronic control device, said set of operation modes including a programming mode, said electronic control device having a microprocessor, a memory, a wireless transceiver, and a display screen, said electronic control device adapted to communicate with said control device over said wireless transceiver, said control device adapted to control an environment regulation system;
 2) in response to selection of said programming mode, displaying a programming calendar including a set of seven day-of-a-week icons in a first orientation, a set of set point categories in said first orientation, a set of time segments in a second orientation being different from said first orientation, a set of set points including a subset of set points corresponding to each set point category in said second orientation, and a graphical highlighter linking and enclosing a first set of grouped days within said set of seven day-of-a-week icons, said set of time segments, said set of set point categories, and said set of set points, wherein:
  a. said set of set point categories includes a time category and a second category;
  b. values of said set points are applicable to all days within said first set of grouped days; and
  c. each day-of-a-week icon within said set of seven day-of-a-week icons that is not within said first set of grouped days is not enclosed within said graphical highlighter;
 3) when a set point within said set of set points corresponding to said time category and a first time segment within said set of time segments is selected, displaying a time adjusting control within said graphical highlighter for adjusting a value of said selected time set point, wherein:
  a. said graphical highlighter when said set of set points are displayed is the same as that when said time adjusting control is displayed;
  b. said graphical highlighter continues to enclose said first set of grouped days when said time adjusting control is displayed; and
  c. each day-of-a-week icon within said set of seven day-of-a-week icons that is not within said first set of grouped days is not enclosed within said graphical highlighter when said time adjusting control is displayed; and
 4) when a set point within said set of set points corresponding to said second category and a second time segment within said set of time segments is selected:
  a. displaying a present value of said selected second category set point within said graphical highlighter; and
  b. displaying a first second-tier graphical highlighter corresponding to said second time segment in said first orientation within said graphical highlighter, said first second-tier graphical highlighter highlighting said selected second category set point and said second time segment, said first second-tier graphical highlighter suppressing each set point within said set of set points that corresponds to said second time segment other than said selected second category set point, wherein:
   i. said present value of said selected second category set point is adjusted through an up adjustment control or a down adjustment control;
   ii. said graphical highlighter when said set of set points are displayed is the same as that when said selected second category set point is selected for adjustment;
   iii. said graphical highlighter continues to enclose said first set of grouped days when said selected second category set point is selected for adjustment; and
   iv. each day-of-a-week icon within said set of seven day-of-a-week icons that is not within said first set of grouped days is not enclosed within said graphical highlighter when said selected second category set point is selected for adjustment.

11. The method of claim 10 wherein said set of set point categories further includes a third category and further comprising, when a set point within said set of set points corresponding to said third category and a third time segment within said set of time segments is selected:
 a. displaying a present value of said selected third category set point within said graphical highlighter; and
 b. displaying a second second-tier graphical highlighter corresponding to said third time segment in said first orientation within said graphical highlighter, said second second-tier graphical highlighter highlighting said selected third category set point and said third time segment, said second second-tier graphical highlighter suppressing each set point within said set of set points that corresponds to said third time segment other than said selected third category set point, wherein:
  1) said present value of said selected third category set point is adjusted through said up adjustment control or said down adjustment control;
  2) said graphical highlighter when said set of set points are displayed is the same as when said selected third category set point is selected for adjustment;
  3) said graphical highlighter continues to enclose said first set of grouped days when said selected third category set point is selected for adjustment; and
  4) each day-of-a-week icon within said set of seven day-of-a-week icons that is not within said first set of grouped days is not enclosed within said graphical highlighter when said selected third category set point is selected for adjustment.

12. The method of claim 11 wherein:
1) said control device is a thermostat;
2) said second category is cool; and
3) said third category is heat.

13. The method of claim 12 wherein said set of set point categories further includes a fan category.

14. The method of claim 10 wherein said first orientation is horizontal, said second orientation is vertical, and said set of set point categories, said set of time segments, and said set of set points form a table structure.

15. The method of claim 11 further comprising
1) displaying a regroup control;
2) in response to selection of said regroup control, displaying a day selection control allowing a user to select any subset of said set of seven day-of-a-week icons to form a second set of grouped days;
3) displaying a group control; and
4) in response to selection of said group control, displaying said programming calendar with said graphical highlighter adjusted to only enclose said second set of grouped days.

\* \* \* \* \*